US012331266B2

(12) United States Patent
Kieffer et al.

(10) Patent No.: US 12,331,266 B2
(45) Date of Patent: Jun. 17, 2025

(54) FAST DRYING AND FAST DRAINING RINSE AID COMPRISING AN EO/PO AND ALKOXYLATED ALCOHOL SURFACTANT MIXTURE

(71) Applicant: ECOLAB USA INC., Saint Paul, MN (US)

(72) Inventors: Janel Marie Kieffer, Saint Paul, MN (US); Victor Fuk-Pong Man, Saint Paul, MN (US); Steven E. Lentsch, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 282 days.

(21) Appl. No.: 17/933,758

(22) Filed: Sep. 20, 2022

(65) Prior Publication Data

US 2023/0088188 A1 Mar. 23, 2023

Related U.S. Application Data

(63) Continuation of application No. 15/929,818, filed on May 22, 2020, now Pat. No. 11,479,742, which is a continuation of application No. 14/980,971, filed on Dec. 28, 2015, now Pat. No. 10,689,597, which is a continuation of application No. 14/623,247, filed on Feb. 16, 2015, now Pat. No. 9,453,184, which is a continuation of application No. 14/149,976, filed on Jan. 8, 2014, now Pat. No. 8,957,011, which is a continuation of application No. 13/857,701, filed on Apr. 5, 2013, now Pat. No. 8,642,530, which is a continuation of application No. 13/652,615, filed on Oct. 16, 2012, now Pat. No. 8,450,264, which is a continuation of application No. 13/470,687, filed on May 14, 2012, now Pat. No. 8,324,147, which is a continuation of application No. 12/778,683, filed on May 12, 2010, now Pat. No. 7,960,333.

(60) Provisional application No. 61/177,444, filed on May 12, 2009.

(51) Int. Cl.

| | |
|---|---|
| ***C11D 1/825*** | (2006.01) |
| ***C11D 1/00*** | (2006.01) |
| ***C11D 1/72*** | (2006.01) |
| ***C11D 1/722*** | (2006.01) |
| ***C11D 3/00*** | (2006.01) |
| ***C11D 3/20*** | (2006.01) |
| ***C11D 3/32*** | (2006.01) |
| ***C11D 3/37*** | (2006.01) |
| ***C11D 3/48*** | (2006.01) |

(52) U.S. Cl.
CPC .............. *C11D 1/722* (2013.01); *C11D 1/008* (2013.01); *C11D 1/72* (2013.01); *C11D 1/825* (2013.01); *C11D 3/0026* (2013.01); *C11D 3/0036* (2013.01); *C11D 3/2068* (2013.01); *C11D 3/323* (2013.01); *C11D 3/3707* (2013.01); *C11D 3/48* (2013.01); *C11D 2111/18* (2024.01)

(58) Field of Classification Search
CPC ........... C11D 1/72; C11D 1/722; C11D 1/825; C11D 3/3707; C11D 3/48; C11D 11/0023; C11D 17/0052; C11D 17/0091
See application file for complete search history.

(56) References Cited

U.S. PATENT DOCUMENTS

| | | | |
|---|---|---|---|
| 4,233,171 A | | 11/1980 | McLaughlin et al. |
| 4,426,362 A | | 1/1984 | Copeland et al. |
| 4,492,646 A | | 1/1985 | Welch |
| 4,618,914 A | | 10/1986 | Sato et al. |
| 4,647,258 A | | 3/1987 | Vassarsch |
| 4,654,161 A | | 3/1987 | Kollmeier et al. |
| 4,687,121 A | | 8/1987 | Copeland |
| 4,690,305 A | | 9/1987 | Copeland |
| RE32,763 E | | 10/1988 | Fernholtz et al. |
| RE32,818 E | | 1/1989 | Fernholtz et al. |
| 4,826,661 A | | 5/1989 | Copeland et al. |
| 4,830,773 A | | 5/1989 | Olson |
| 5,358,653 A | * | 10/1994 | Gladfelter .......... C11D 17/0052 510/438 |
| 5,397,506 A | | 3/1995 | Groth et al. |
| 5,474,698 A | | 12/1995 | Rolando et al. |
| 5,501,815 A | | 3/1996 | Man |

(Continued)

FOREIGN PATENT DOCUMENTS

| | | |
|---|---|---|
| DE | 4401235 A1 | 7/1995 |
| DE | 10003809 A1 | 8/2001 |

(Continued)

OTHER PUBLICATIONS

BASF Corporation Technical Bulletin, "Plurafac LF-221 Alcohol Alkoxylate", 2002 BASF Corporation, Mount Olive, New Jersey (1 page). Dec. 31, 2002.

(Continued)

*Primary Examiner* — Charles I Boyer
(74) *Attorney, Agent, or Firm* — McKee, Voorhees & Sease, PLC

(57) ABSTRACT

The present invention is directed to rinse aid compositions and methods for making and using the rinse aid compositions. The compositions of the invention include a sheeting agent, a defoaming agent, and an association disruption agent. The rinse aid compositions of the present invention result in a faster draining/drying time on most substrates compared to conventional rinse aids. The rinse aid compositions of the present invention are especially suitable for use on plastic substrates.

16 Claims, 8 Drawing Sheets

(56) References Cited

U.S. PATENT DOCUMENTS

| | | | | |
|---|---|---|---|---|
| 5,545,352 | A * | 8/1996 | Pike | C11D 3/33 510/223 |
| 5,589,099 | A | 12/1996 | Baum | |
| 5,603,776 | A * | 2/1997 | Lentsch | C11D 1/667 134/29 |
| 5,674,831 | A | 10/1997 | Schulz et al. | |
| 5,876,514 | A | 3/1999 | Rolando et al. | |
| 5,880,089 | A | 3/1999 | Lentsch et al. | |
| H1818 | H | 11/1999 | Potgieter et al. | |
| 6,258,765 | B1 | 7/2001 | Wei et al. | |
| 6,294,515 | B1 | 9/2001 | Baum | |
| 6,530,383 | B1 | 3/2003 | Rogmann et al. | |
| 6,537,961 | B1 | 3/2003 | Koch | |
| RE38,262 | E | 10/2003 | Rolando et al. | |
| 6,630,440 | B1 * | 10/2003 | Song | C11D 3/3472 510/525 |
| 6,730,645 | B1 * | 5/2004 | Foley | C11D 1/66 510/229 |
| 6,790,817 | B2 | 9/2004 | Gladfelter | |
| 6,956,019 | B2 | 10/2005 | Lentsch et al. | |
| 7,279,455 | B2 | 10/2007 | Kiefer et al. | |
| 7,592,301 | B2 | 9/2009 | Smith et al. | |
| 7,960,333 | B2 | 6/2011 | Kieffer et al. | |
| 8,211,851 | B2 | 7/2012 | Kieffer et al. | |
| 8,324,147 | B2 | 12/2012 | Kieffer et al. | |
| 8,450,264 | B1 | 5/2013 | Kieffer et al. | |
| 8,642,530 | B2 | 2/2014 | Kieffer et al. | |
| 8,957,011 | B2 | 2/2015 | Kieffer et al. | |
| 2002/0192340 | A1 | 12/2002 | Swart et al. | |
| 2003/0109403 | A1 | 6/2003 | Man et al. | |
| 2003/0171243 | A1 * | 9/2003 | Kischkel | C11D 3/38 510/505 |
| 2004/0033269 | A1 | 2/2004 | Hei et al. | |
| 2004/0110657 | A1 * | 6/2004 | Strothoff | C11D 1/825 510/426 |
| 2004/0157760 | A1 | 8/2004 | Man et al. | |
| 2005/0101516 | A1 * | 5/2005 | Kieffer | C11D 3/3707 510/514 |
| 2006/0046954 | A1 | 3/2006 | Smith et al. | |
| 2006/0246242 | A1 | 11/2006 | Siegel et al. | |
| 2007/0253926 | A1 | 11/2007 | Tadrowski et al. | |
| 2008/0293615 | A1 * | 11/2008 | Kieffer | C11D 1/825 510/514 |
| 2009/0035339 | A1 | 2/2009 | Istvan et al. | |
| 2009/0196897 | A1 * | 8/2009 | Gladfelter | C11D 17/041 252/186.1 |
| 2010/0009886 | A1 | 1/2010 | Smith et al. | |
| 2010/0300044 | A1 | 12/2010 | Man et al. | |
| 2012/0231992 | A1 | 9/2012 | Kieffer et al. | |
| 2013/0172228 | A1 | 7/2013 | Bartelme et al. | |

FOREIGN PATENT DOCUMENTS

| | | | |
|---|---|---|---|
| DE | 69918694 | T2 | 7/2005 |
| EP | 0343503 | A1 | 11/1989 |
| EP | 0875556 | A2 | 4/1998 |
| EP | 1229103 | A2 | 8/2002 |
| EP | 1102834 | B1 | 7/2004 |
| EP | 3425035 | A1 | 1/2019 |
| JP | 2009111294 | A | 5/2009 |
| WO | 8911525 | A1 | 11/1989 |
| WO | 9811187 | A1 | 3/1998 |
| WO | 0008125 | A1 | 2/2000 |
| WO | 0046327 | A1 | 8/2000 |
| WO | 0183879 | A1 | 11/2001 |
| WO | 0226926 | A1 | 4/2002 |
| WO | 2005047440 | A1 | 5/2005 |
| WO | 2005085321 | A1 | 9/2005 |
| WO | 2008137802 | A2 | 11/2008 |
| WO | 2008146177 | A1 | 12/2008 |
| WO | 2010131217 | A1 | 11/2010 |

OTHER PUBLICATIONS

DOW Personal Care, "Kathon CG, A Safe, Effective, Globally Approved Preservative for Rinse-Off Products", Rohm and Haas, 2007 (9 pages). Dec. 31, 2007.

European Patent Office, "European Search Report", issued in connection to European Application No. 16206996.7, date of search Apr. 21, 2017, 6 pages. 2017.

Dhakal et al., "Assessing the Efficacy of Sodium Bisulfate and Organic Acid Treatments for Control of *Salmonella typhimurium* in Rendered Chicken Fat Applied to Pet Foods," Journal of Food Protection, Nov. 2019, vol. 82, No. 11, pp. 1-15.

Wikipedia, "Glutaraldehyde," retrieved from the Internet Jul. 14, 2023. Retrieved from the Internet <URL:https://en.wikipedia.org/wiki/Glutaraldehyde>, 7 pages.

Wikipedia, "Methylchloroisothiazolinone," retrieved from the Internet Jul. 14, 2023. Retrieved from the Internet <URL: https:en.wikipedia.org/wiki/Methylchloroisothiazolinone#:~:text=it is a white solid,most aerobic and anaerobic bacteria.>, 4 pages.

* cited by examiner

FAST DRYING AND FAST DRAINING RINSE AID COMPRISING AN EO/PO AND ALKOXYLATED ALCOHOL SURFACTANT MIXTURE

RELATED APPLICATIONS

This application is a continuation of U.S. Ser. No. 15/929,818, filed May 22, 2020, which is a continuation of U.S. Ser. No. 14/980,971, filed Dec. 28, 2015, now U.S. Pat. No. 10,689,597, issued Jun. 23, 2020, which is a continuation of U.S. Ser. No. 14/623,247 filed Feb. 16, 2015, now U.S. Pat. No. 9,453,184, issued Sep. 27, 2016, which is a continuation of U.S. Ser. No. 14/149,976 filed Jan. 8, 2014, now U.S. Pat. No. 8,957,011 issued Feb. 17, 2015, which is a continuation of U.S. Ser. No. 13/857,701 filed Apr. 5, 2013, now U.S. Pat. No. 8,642,530 issued Feb. 4, 2014, which is a continuation of U.S. Ser. No. 13/652,615 filed Oct. 16, 2012, now U.S. Pat. No. 8,450,264 issued on May 28, 2013, which is a continuation of U.S. Ser. No. 13/470,687 filed May 14, 2012, now U.S. Pat. No. 8,324,147 issued on Dec. 4, 2012, which is a continuation of U.S. Ser. No. 12/778,683 filed on May 12, 2010, now U.S. Pat. No. 7,960,333, issued on Jun. 14, 2011, which application claims priority to U.S. Provisional Application Ser. No. 61/177,444 filed on May 12, 2009 and entitled "Fast Drying and Fast Draining Rinse Aid." The entire contents of these patent applications are hereby expressly incorporated herein by reference including, without limitation, the specification, claims, and abstract, as well as any figures, tables, or drawings thereof.

This application is also related to U.S. Provisional Application Ser. No. 61/181,836, filed on May 28, 2009, and U.S. Utility application Ser. No. 12/778,711 filed on May 12, 2010 now U.S. Pat. No. 8,567,161 issued on Oct. 29, 2013, both entitled "Wetting Agents for Aseptic Filling." The entire contents of these patent applications are hereby expressly incorporated herein by reference including, without limitation, the specification, claims and abstract, as well as any figures, tables, or drawings thereof.

FIELD OF INVENTION

The present invention relates to rinse aid compositions, and methods for manufacturing and using the rinse aid compositions. The rinse aid compositions generally include a sheeting agent, a defoaming agent, and an association disruption agent. The rinse aids can be used in aqueous solutions on articles including, for example, cookware, dishware, flatware, glasses, cups, hard surfaces, glass surfaces, vehicle surfaces, etc. The rinse aids are especially effective on plastic surfaces. The rinse aids can also be used as wetting agents for use in aseptic filling procedures.

BACKGROUND

Mechanical warewashing machines including dishwashers have been common in the institutional and household environments for many years. Such automatic warewashing machines clean dishes using two or more cycles which can include initially a wash cycle followed by a rinse cycle. Such automatic warewashing machines can also utilize other cycles, for example, a soak cycle, a pre-wash cycle, a scrape cycle, additional wash cycles, additional rinse cycles, a sanitizing cycle, and/or a drying cycle. Any of these cycles can be repeated, if desired and additional cycles can be used. Rinse aids are conventionally used in warewashing applications to promote drying and to prevent the formation of spots on the ware being washed.

In order to reduce the formation of spotting, rinse aids have commonly been added to water to form an aqueous rinse that is sprayed on the ware after cleaning is complete. A number of rinse aids are currently known, each having certain advantages and disadvantages. There is an ongoing need for alternative rinse aid compositions.

SUMMARY

In some aspects, the present invention relates to an aqueous rinse aid composition. The rinse aid composition consists essentially of a sheeting agent, a defoaming agent, one or more of an association disruption agent, and an additional ingredient. The additional ingredient is selected from the group consisting of a carrier, a hydrotrope, a chelating/sequestering agent, and combinations thereof.

In some embodiments, the sheeting agent comprises at least one compound having the structure represented by formula I:

$$R—O—(CH_2CH_2O)_n—H \quad (I)$$

wherein R is a $(C_1\text{-}C_{12})$ alkyl group, and n is an integer in the range of 1 to 100. In other embodiments, n is an integer in the range of 10 to 50. In still yet other embodiments, n is an integer in the range of 15 to 30. In some embodiments, n is 21.

In other embodiments, the defoaming agent comprises a polymer compound including one or more ethylene oxide groups. In yet other embodiments, the defoaming agent includes a polyether compound prepared from ethylene oxide, propylene oxide, or a mixture thereof. In still yet other embodiments, the defoaming agent comprises a polyoxypropylene-polyoxyethylene block copolymer surfactant.

In some embodiments, the one or more association disruption agent comprises an alcohol alkoxylate. In other embodiments, the association disruption agent is selected from the group consisting of ethylene oxides, propylene oxides, butylene oxides, pentalene oxides, hexylene oxides, heptalene oxides, octalene oxides, nonalene oxides, decylene oxides, and mixtures and derivatives thereof.

In some embodiments, the sheeting agent is present at about 1 wt % to about 10 wt %. In other embodiments, the sheeting agent is present at about 2 wt % to about 5 wt %. In still yet other embodiments, the defoaming agent is present at about 1 wt % to about 10 wt %. In still yet other embodiments, the defoaming agent is present at about 2 wt % to about 5 wt %.

In some embodiments, the one or more association disruption agent is present at between about 1 wt % to about 25 wt %. In other embodiments, the one or more disruption agent is present at between about 10 wt % to about 20 wt %.

In some embodiments, the ratio of sheeting agent to defoaming agent to association disrupting agent is about 1.0:1.5:30 to about 1:2:1. In other embodiments, the association disruption agent is present at an amount effective to reduce the contact angle of the composition by between about 5° to about 15°. In still yet other embodiments, the additional ingredient comprises at least about 50 wt % of a carrier. In other embodiments, the carrier comprises water.

In some aspects, the present invention is related to methods for rinsing ware in a warewashing application. The methods comprise providing an aqueous rinse aid composition, the rinse aid composition consisting essentially of: a sheeting agent, a defoaming agent, one or more of an association disruption agent; and an additional ingredient selected from the group consisting of a carrier, a hydrotrope, a chelating/sequestering agent, and combinations thereof. The method also comprises diluting the rinse aid composition with water to form an aqueous use solution; and applying the aqueous use solution to the ware.

In some embodiments, the ware comprises plasticware. In other embodiments, the ware dries within about 30 to about 90 seconds after the aqueous solution is applied to the ware.

DETAILED DESCRIPTION

Figure 1:
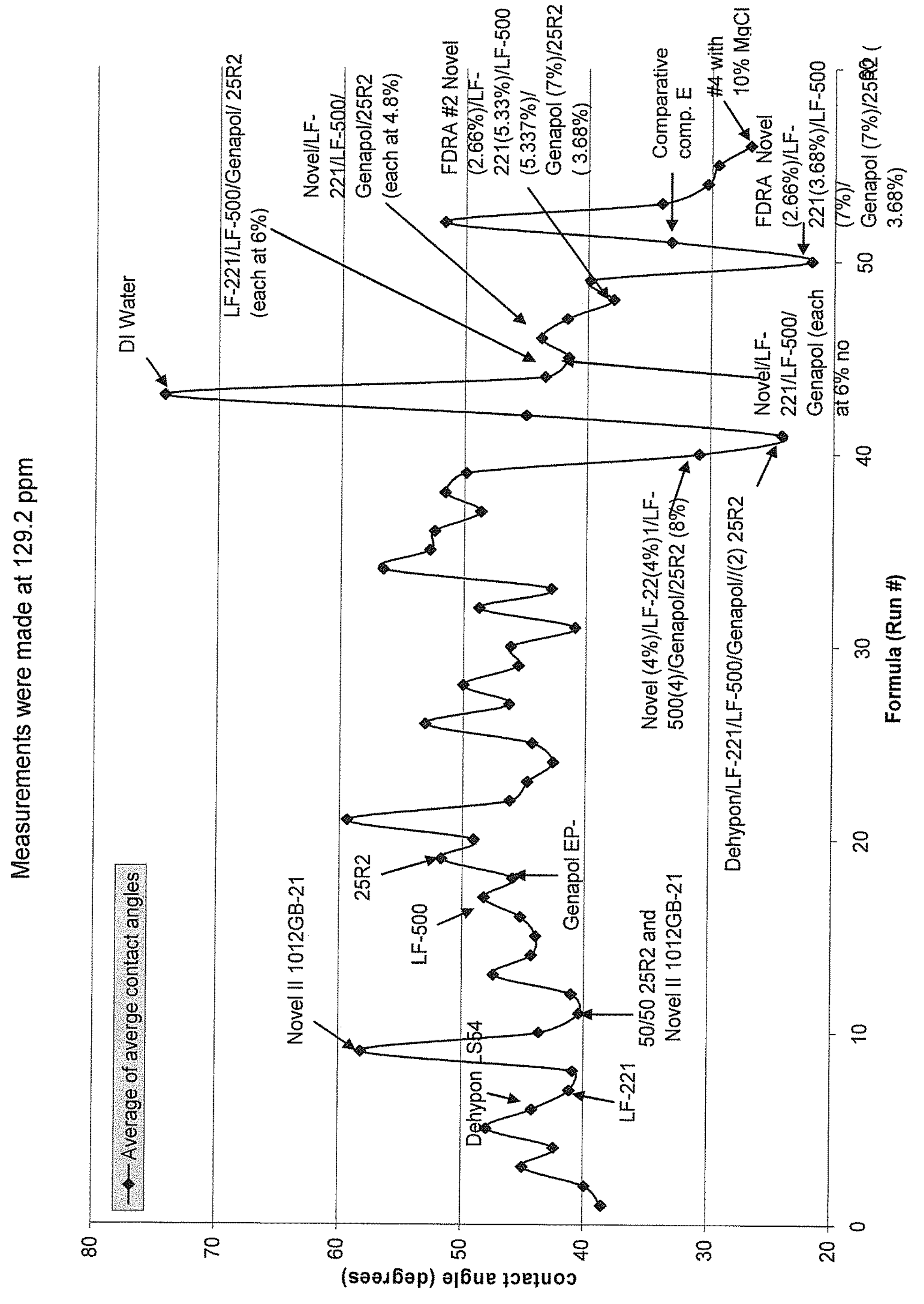
FIG. 1 is a graphical depiction of the average of the average contact angle of various surfactants and exemplary rinse aid compositions on various substrates.

The present invention relates to rinse aid compositions, and methods for making and using rinse aid compositions. In some aspects, the present invention provides rinse aid compositions including a sheeting agent, a defoaming agent, and one or more of an association disruption agent. It has been found that the combination of a sheeting agent, a defoaming agent, and one or more association disruption agent acts synergistically to produce a low foaming rinse aid composition with a moderately low viscoelasticity and increased wetting properties. Further, the rinse aid compositions of the present invention have increased drying and draining times compared to conventional rinse aid compositions.

The compositions of the present invention can be used to reduce spotting and filming on a variety of surfaces including, but not limited to, plasticware, cookware, dishware, flatware, glasses, cups, hard surfaces, glass surfaces, and vehicle surfaces. The compositions of the invention can also be used as wetting agents in a variety of applications, e.g., aseptic packaging/filling. So that the invention may be understood more clearly, certain terms are first defined.

As used herein, the term "antiredeposition agent" refers to a compound that helps keep a soil composition suspended in water instead of redepositing onto the object being cleaned.

As used herein, the term "ware" refers to items such as eating, cooking, and serving utensils. Exemplary items of ware include, but are not limited to: dishes, e.g., plates and bowls; silverware, e.g., forks, knives, and spoons; cups and glasses, e.g., drinking cups and glasses; serving dishes, e.g., fiberglass trays, insulated plate covers. As used herein, the term "warewashing" refers to washing, cleaning, or rinsing ware. The items of ware that can be contacted, e.g., washed, or rinsed, with the compositions of the invention can be made of any material. For example, ware includes items made of wood, metal, ceramics, glass, etc. Ware also refers to items made of plastic. Types of plastics that can be cleaned or rinsed with the compositions according to the invention include but are not limited to, those that include polycarbonate polymers (PC), acrilonitrile-butadiene-styrene polymers (ABS), and polysulfone polymers (PS). Another exemplary plastic that can be cleaned using the methods and compositions of the invention include polyethylene terephthalate (PET).

As used herein, the term "hard surface" includes showers, sinks, toilets, bathtubs, countertops, windows, mirrors, transportation vehicles, floors, and the like.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.,), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

By the term "solid" as used to describe a composition of the present invention, it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid composition can range from that of a fused solid block which is relatively dense and hard, for example, like concrete, to a consistency characterized as being malleable and sponge-like, similar to caulking material.

The "cloud point" of a surfactant rinse or sheeting agent is defined as the temperature at which a 1 wt. % aqueous solution of the surfactant turns cloudy when warmed.

As used herein, the term "alkyl" refers to a straight or branched chain monovalent hydrocarbon radical optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, mercapto, amino, alkyl substituted amino, or halo, for example. Examples of "alkyl" as used herein include, but are not limited to, methyl, ethyl, n-propyl, n-butyl, n-pentyl, isobutyl, and isopropyl, and the like. In addition, "alkyl" may include "alylenes", "alkenylenes", or "alkylynes".

As used herein, the term "alkylene" refers to a straight or branched chain divalent hydrocarbon radical optionally containing one or more heteroatomic substitutions independently selected from S, O, Si, or N. Alkylene groups generally include those with one to twenty atoms. Alkylene groups may be unsubstituted or substituted with those substituents that do not interfere with the specified function of the composition. Substituents include alkoxy, hydroxy, mercapto, amino, alkyl substituted amino, or halo, for example. Examples of "alkylene" as used herein include, but are not limited to, methylene, ethylene, propane-1,3-diyl, propane-1,2-diyl and the like.

As used herein, the term "alkenylene" refers to a straight or branched chain divalent hydrocarbon radical having one or more carbon-carbon double bonds and optionally containing one or more heteroatomic substitutions independently selected from S, O, Si, or N. Alkenylene groups generally include those with one to twenty atoms. Alkenylene groups may be unsubstituted or substituted with those substituents that do not interfere with the specified function of the composition. Substituents include alkoxy, hydroxy, mercapto, amino, alkyl substituted amino, or halo, for example. Examples of "alkenylene" as used herein include, but are not limited to, ethene-1,2-diyl, propene-1,3-diyl, and the like.

As used herein, the term "alkylyne" refers to a straight or branched chain divalent hydrocarbon radical having one or more carbon-carbon triple bonds and optionally containing one or more heteroatomic substitutions independently selected from S, O, Si, or N. Alkylyne groups generally include those with one to twenty atoms. Alkylyne groups may be unsubstituted or substituted with those substituents that do not interfere with the specified function of the composition. Substituents include alkoxy, hydroxy, mercapto, amino, alkyl substituted amino, or halo, for example.

As used herein, the term "alkoxy", refers to —O-alkyl groups wherein alkyl is as defined above.

As used herein, the term "halogen" or "halo" shall include iodine, bromine, chlorine and fluorine.

As used herein, the terms "mercapto" and "sulfhydryl" refer to the substituent —SH.

As used herein, the term "hydroxy" refers to the substituent —OH.

A used herein, the term "amino" refers to the substituent $—NH_2$.

The methods and compositions of the present invention can comprise, consist of, or consist essentially of the listed steps or ingredients. As used herein the term "consisting essentially of" shall be construed to mean including the listed ingredients or steps and such additional ingredients or steps which do not materially affect the basic and novel properties of the composition or method. In some embodiments, a composition in accordance with embodiments of the present invention that "consists essentially of" the recited ingredients does not include any additional ingredients that alter the basic and novel properties of the composition, e.g., the drying time, sheeting ability, spotting or filming properties of the composition.

As used herein, "weight percent (wt %)," "percent by weight," "% by weight," and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

Rinse Aid Compositions

In some aspects, the present invention provides compositions that can be used as rinse aids. The rinse aid compositions of the present invention have been found to be effective at reducing spotting and filming on a variety of substrates, particularly on plastic ware.

The rinse aid compositions of the present invention include a sheeting agent, a defoaming agent, and one or more association disruption agent. The sheeting agents for use with the rinse aids of the present invention include surfactants which are prone to association, giving rise to a higher thin film viscoelasticity. That is, the sheeting agents yield a relatively high and stable foam, with a relatively slow drainage time. It has been found that these sheeting agents can be defoamed using relatively simple defoaming agents. Although included in the compositions of the present invention primarily to defoam the sheeting agents, the defoaming agents for use in the present invention can also contribute to the sheeting performance of the compositions of the present invention.

The rinse aid compositions of the present invention also include an association disruption agent. As used herein the terms "association disruption agent" or "association disrupting agent" refer to a class of surfactants capable of altering, e.g., interrupting, the association of the sheeting and defoaming agents included in the compositions of the present invention. Without wishing to be bound by any particular theory, it is thought that the association disruption agents aid in the drying/draining time of the rinse aid compositions from the contacted substrates. That is, it is thought that by interrupting or reducing the association of the other active components of the rinse aid, the association disruption agents decrease the drainage time of the rinse aid from a surface. Similar to the defoaming agents however, the association disruption agents can also contribute to the sheeting performance of the compositions of the present invention.

Sheeting Agents

In some aspects, the rinse aid compositions of the present invention include a sheeting agent. In some embodiments, the sheeting agent includes one or more alcohol ethoxylate compounds that include an alkyl group that has 12 or fewer carbon atoms. For example, alcohol ethoxylate compounds for use in the rinse aids of the present invention may each independently have structure represented by Formula I:

$$R—O—(CH_2CH_2O)_n—H \quad (I)$$

wherein R is a ($C_1$-$C_{12}$) alkyl group and n is an integer in the range of 1 to 100. In some embodiments, R may be a ($C_5$-$C_{12}$) alkyl group, or may be a ($C_5$-$C_{10}$) alkyl group. Similarly, in some embodiments, n is an integer in the range of 10-50, or in the range of 15-30, or in the range of 20-25. In some embodiments, the one or more alcohol ethoxylate compounds are straight chain hydrophobes.

In at least some embodiments, the sheeting agent includes at least two different alcohol ethoxylate compounds each having structure represented by Formula I. That is, the R and/or n variables of Formula I, or both, may be different in the two or more different alcohol ethoxylate compounds present in the sheeting agent. For example, the sheeting agent in some embodiments may include a first alcohol ethoxylate compound in which R is a ($C_5$-$C_{10}$) alkyl group, and a second alcohol ethoxylate compound in which R is a ($C_{10}$-$C_{12}$) alkyl group. In at least some embodiments, the sheeting agent does not include any alcohol ethoxylate compounds that include an alkyl group that has more than 12 carbon atoms. In some embodiments, the sheeting agent includes only alcohol ethoxylate compounds that include an alkyl group that has 12 or fewer carbon atoms.

In some embodiments where, for example, the sheeting agent includes at least two different alcohol ethoxylate compounds, the ratio of the different alcohol ethoxylate compounds can be varied to achieve the desired characteristics of the final composition. For example, in some embodiments including a first alcohol ethoxylate compound and a second alcohol ethoxylate compound, the ratio of weight-percent first alcohol ethoxylate compound to weight-percent second compound may be in the range of about 1:1 to about 10:1 or more. For example, in some embodiments, the sheeting agent can include in the range of about 50% weight percent or more of the first compound, and in the range of about 50 weight percent or less of the second compound, and/or in the range of about 75 weight percent or more of the first compound, and in the range of about 25 weight percent or less of the second compound, and/or in the range of about 85 weight percent or more of the first compound, and in the range of about 15 weight percent or less of the second compound. Similarly, the range of mole ratio of the first compound to the second compound may be about 1:1 to about 10:1, and in some embodiments, in the range of about 3:1 to about 9:1.

In some embodiments, the alcohol ethoxylates used in the sheeting agent can be chosen such that they have certain characteristics, for example, are environmentally friendly, are suitable for use in food service industries, and/or the like. For example, the particular alcohol ethoxylates used in the sheeting agent may meet environmental or food service regulatory requirements, for example, biodegradability requirements.

Some specific examples of suitable sheeting agents that may be used include an alcohol ethoxylate combination including a first alcohol ethoxylate wherein R is a $C_{10}$ alkyl group and n is 21 (i.e. 21 moles ethylene oxide) and a second alcohol ethoxylate wherein R is a $C_{12}$ alkyl group and again, n is 21 (i.e. 21 moles ethylene oxide). Such a combination can be referred to as an alcohol ethoxylate $C_{10\text{-}12}$, 21 moles EO. In some particular embodiments, the sheeting agent may include in the range of about 85 wt. % or more of the $C_{10}$ alcohol ethoxylate and about 15 wt. % or less of the $C_{12}$ alcohol ethoxylate. For example, the sheeting agent may include in the range of about 90 wt. % of the $C_{10}$ alcohol ethoxylate and about 10 wt. % of the $C_{12}$ alcohol ethoxylate. One example of such an alcohol ethoxylate mixture is commercially available from Sasol as NOVEL II 1012-21.

In some embodiments, the sheeting agent can be present in the composition from about 1 wt % to about 10 wt % of the total composition. In other embodiments, the sheeting agent can be present at from about 2 wt % to about 5 wt % of the total composition. For some diluted or use solutions, for example, aqueous use solutions, the sheeting agent can be present at from about 5 ppm to about 250 ppm of the total use solution, about 50 ppm to about 150 ppm of the total use solution, or form about 60 ppm to 100 ppm of the total use solution. It is to be understood that all values and ranges between these values and ranges are encompassed by the present invention.

Defoaming Agent

In some aspects, the rinse aid composition can also include a defoaming agent. The defoaming agent is present at amount effective for reducing the stability of foam that may be created by the sheeting agent in an aqueous solution. The defoaming agent can also contribute to the sheeting performance of the compositions of the present invention. Any of a broad variety of suitable defoamers may be used, for example, any of a broad variety of nonionic ethylene oxide (EO) containing surfactants. Many nonionic ethylene oxide derivative surfactants are water soluble and have cloud points below the intended use temperature of the rinse aid composition, and therefore may be useful defoaming agents.

While not wishing to be bound by theory, it is believed that suitable nonionic EO containing surfactants are hydrophilic and water soluble at relatively low temperatures, for example, temperatures below the temperatures at which the rinse aid will be used. It is theorized that the EO component forms hydrogen bonds with the water molecules, thereby solubilizing the surfactant. However, as the temperature is increased, these hydrogen bonds are weakened, and the EO containing surfactant becomes less soluble, or insoluble in water. At some point, as the temperature is increased, the cloud point is reached, at which point the surfactant precipitates out of solution, and functions as a defoamer. The surfactant can therefore act to defoam the sheeting agent component when used at temperatures at or above this cloud point.

Some examples of ethylene oxide derivative surfactants that may be used as defoamers include polyoxyethylene-polyoxypropylene block copolymers, alcohol alkoxylates, low molecular weight EO containing surfactants, or the like, or derivatives thereof. Some examples of polyoxyethylene-polyoxypropylene block copolymers include those having the following formulae:

(EO)x(PO)y(EO)x (PO)y(EO)x(PO)y (PO)y(EO)x(PO)y(EO)x(PO)y

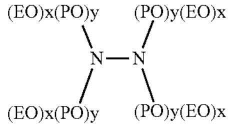

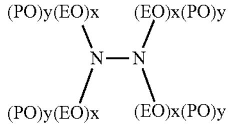

wherein EO represents an ethylene oxide group, PO represents a propylene oxide group, and x and y reflect the average molecular proportion of each alkylene oxide monomer in the overall block copolymer composition. In some embodiments, x is in the range of about 10 to about 130, y is in the range of about 15 to about 70, and x plus y is in the range of about 25 to about 200. It should be understood that each x and y in a molecule can be different. In some embodiments, the total polyoxyethylene component of the block copolymer can be in the range of at least about 20 mol-% of the block copolymer and in some embodiments, in the range of at least about 30 mol-% of the block copolymer. In some embodiments, the material can have a molecular weight greater than about 400, and in some embodiments, greater than about 500. For example, in some embodiments, the material can have a molecular weight in the range of about 500 to about 7000 or more, or in the range of about 950 to about 4000 or more, or in the range of about 1000 to about 3100 or more, or in the range of about 2100 to about 6700 or more.

Although the exemplary polyoxyethylene-polyoxypropylene block copolymer structures provided above have 3-8 blocks, it should be appreciated that the nonionic block copolymer surfactants can include more or less than 3 or 8 blocks. In addition, the nonionic block copolymer surfactants can include additional repeating units such as butylene oxide repeating units. Furthermore, the nonionic block copolymer surfactants that can be used according to the invention can be characterized heteric polyoxyethylene-polyoxypropylene block copolymers. Some examples of suitable block copolymer surfactants include commercial products such as PLURONIC® and TETRONIC® surfactants, commercially available from BASF. For example, PLURONIC® 25-R2 is one example of a useful block copolymer surfactant commercially available from BASF.

The defoamer component can comprise a very broad range of weight percent of the entire composition, depending upon the desired properties. For example, for concentrated embodiments, the defoamer component can comprise in the range of 1 to about 10 wt % of the total composition, in some embodiments in the range of about 2 to about 5 wt % of the total composition, in some embodiments in the range of about 20 to about 50 wt % of the total composition, and in some embodiments in the range of about 40 to about 90 wt % of the total composition. For some diluted or use solutions, the defoamer component can comprise in the range of 5 to about 60 ppm of the total use solution, in some embodiments in the range of about 50 to about 150 ppm of the total use solution, in some embodiments in the range of about 100 to about 250 ppm of the total use solution, and in some embodiments in the range of about 200 to about 500 ppm of the use solution.

The amount of defoaming agent present in the composition can also be dependent upon the amount of sheeting agent present in the composition. For example, less sheeting agent present in the composition may provide for the use of less defoamer component. In some example embodiments, the ratio of weight-percent sheeting agent component to weight-percent defoamer component may be in the range of about 1:5 to about 5:1, or in the range of about 1:3 to about 3:1. The ratio of sheeting agent component to defoamer component may be dependent on the properties of either and/or both actual components used, and these ratios may vary from the example ranges given to achieve the desired defoaming effect.

Association Disruption Agent

In some aspects, the rinse aid composition can also include one or more of an association disruption agent. Association disruption agents suitable for use in the compositions of the present invention include surfactants that are capable of altering, e.g., interrupting, the association of the other active agents, e.g., sheeting and defoaming agents, included in the rinse aids of the present invention.

In some embodiments, the association disruption agents included in the rinse aid compositions of the present invention reduce the contact angle of the rinse aid compositions. For example, in some embodiments, the association disruption agents reduce the contact angle of the rinse aid compositions by about 5°, about 10°, or by about 15°. Without wishing to be bound by any particular theory, it is thought that the lower the contact angle, the more a composition will induce sheeting. That is, compositions with lower contact angles will form droplets on a substrate with a larger surface area than compositions with higher contact angles. The increased surface area results in a faster drying time, with fewer spots formed on the substrate.

A variety of disruption association agents can be used in the rinse aid compositions of the present invention. In some embodiments, the association disruption agent includes an alcohol alkoxylate. In some embodiments, the alcohol alkoxylate includes a polyoxyethylene-polyoxypropylene copolymer surfactant (an "alcohol EO/PO surfactant"). The alcohol EO/PO surfactant can include a compact alcohol EO/PO surfactant where the EO and PO groups are in small block form, or random form. In other embodiments, the alcohol alkoxylate includes an ethylene oxide, a propylene oxide, a butylene oxide, a pentalene oxide, a hexylene oxide, a heptalene oxide, an octalene oxide, a nonalene oxide, a decylene oxide, and mixtures thereof. In some embodiments, the one or more association disruption agent includes a $C_{12}$-$C_{14}$ fatty alcohol EO/PO surfactant.

Exemplary commercially available association disruption agents include, but are not limited to, Genapol EP-2454® (commercially available from Clariant), Plurafac LF-221® (commercially available from BASF), Plurafac LF-500® (commercially available from BASF), and Dehypon® LS-54 (commercially available from Cognis).

In some embodiments, the rinse aid compositions of the present invention include one or more disruption association agent. In other embodiments, the rinse aid compositions of the present invention include at least two, at least three or at least four association disruption agents.

The association disruption agents can be present in the rinse aid compositions at between about 1 wt % to about 25 wt %. In some embodiments, the disruption association agent is present in the rinse aid composition at between about 10 wt % to about 20 wt %. In other embodiments, the disruption association agent is present in the rinse aid composition at about 15 w %.

In some embodiments the ratio of the sheeting agent, defoaming agent, and association disruption agent is selected so as to maximize the draining/drying time of the rinse aid compositions of the present invention. In some embodiments, the ratio of sheeting agent to defoaming agent to association disrupting agent is from about 1:1.5:30 to about 1:2:1. In some embodiments, the ratio of sheeting agent to defoaming agent to association disrupting agent is about 1:1.6:6.8. It is to be understood that all values and ranges between these values and ranges are encompassed by the present invention.

Additional Ingredients

The rinse aid compositions of the present invention may also optionally include a number of additional additives and/or functional materials. For example, the rinse aid can additionally include carriers, hydroptropes, chelating/sequestering agents, bleaches and/or bleach activators, sanitizers and/or anti-microbial agents, activators, detergent builder or fillers, anti-redeposition agents, optical brighteners, dyes, odorants or perfumes, preservatives, stabilizers, processing aids, corrosion inhibitors, fillers, solidifiers, hardening agent, solubility modifiers, pH adjusting agents, humectants, water treatment polymers and/or phosphonates, functional polydimethylsiloxones, or the like, or any other suitable additive, or mixtures or combinations thereof. The compositions of the invention may also exclude any one or more of the additional ingredients.

Carriers

In some embodiments, the compositions of the present invention are formulated as liquid compositions. Carriers can be included in such liquid formulations. Any carrier suitable for use in a rinse aid composition can be used in the present invention. For example, in some embodiments the compositions include water as a carrier.

In some embodiments, liquid rinse aid compositions according to the present invention will contain no more than about 98 wt % water and typically no more than about 90 wt %. In other embodiments, liquid rinse aid compositions will contain at least 50 wt % water, or at least 60 wt % water as a carrier.

Hydrotropes

In some embodiments, the compositions of the present invention can include a hydrotrope. The hydrotrope may be used to aid in maintaining the solubility of sheeting or wetting agents. Hydrotropes can also be used to modify the compositions creating increased solubility for the organic material. In some embodiments, hydrotropes are low molecular weight aromatic sulfonate materials such as xylene sulfonates, dialkyldiphenyl oxide sulfonate materials, and cumene sulfonates.

A hydrotrope or combination of hydrotropes can be present in the compositions at an amount of from between about 1 wt % to about 50 wt %. In other embodiments, a hydrotrope or combination of hydrotropes can be present at about 10 wt % to about 30 wt % of the composition.

Chelating/Sequestering Agents

The rinse may optionally include one or more chelating/sequestering agent as an additional ingredient. A chelating/sequestering agent may include, for example an aminocarboxylic acid, a condensed phosphate, a phosphonate, a polyacrylate, and mixtures and derivatives thereof. In general, a chelating agent is a molecule capable of coordinating (i.e., binding) the metal ions commonly found in natural water to prevent the metal ions from interfering with the action of the other ingredients of a rinse aid or other cleaning composition. The chelating/sequestering agent may also function as a threshold agent when included in an effective amount. In some embodiments, a rinse aid can include in the range of up to about 70 wt %, or in the range of about 0.1 to about 60 wt %, or about 0.1 to about 5.0 wt %, of a chelating/sequestering agent. In other embodiments, the rinse aid compositions can include less than about 1 wt %, or less than about 0.5 wt % of a chelating agent.

The composition may include a phosphonate such as 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt $O^+Na^-$
|
$POCH_2N[CH_2PO(ONa)_2]_2$
|
OH 2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene) triamine(pentamethylenephosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

Some examples of polymeric polycarboxylates suitable for use as sequestering agents include those having a pendant carboxylate ($—CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed poly amide-methacrylamide copolymers, hydrolyzed poly acrylonitrile, hydrolyzed polymethacrylonitrile, hydrolyzed acrylonitrile-methacrylonitrile copolymers, and the like.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Bleaching Agents

The rinse aid can optionally include a bleaching agent. Bleaching agents can be used for lightening or whitening a substrate, and can include bleaching compounds capable of liberating an active halogen species, such as $Cl_2$, $Br_2$, $—OCl^-$ and/or $—OBr^-$, or the like, under conditions typically encountered during the cleansing process. Suitable bleaching agents for use can include, for example, chlorine-containing compounds such as a chlorine, a hypochlorite, chloramines, of the like. Some examples of halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition.

A bleaching agent may also include an agent containing or acting as a source of active oxygen. The active oxygen compound acts to provide a source of active oxygen, for example, may release active oxygen in aqueous solutions. An active oxygen compound can be inorganic or organic, or can be a mixture thereof. Some examples of active oxygen compound include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. A rinse aid composition may include a minor but effective amount of a bleaching agent, for example, in some embodiments, in the range of up to about 10 wt. %, and in some embodiments, in the range of about 0.1 to about 6 wt. %.

Anti-Microbial Agents

The rinse aid can optionally include an antimicrobial agent. Antimicrobial agents are chemical compositions that can be used in a functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that active oxygen compounds, such as those discussed above in the bleaching agents section, may also act as antimicrobial agents, and can even provide sanitizing activity. In some embodiments, the ability of the active oxygen compound to act as an antimicrobial agent reduces the need for additional antimicrobial agents within the composition. For example, percarbonate and percarboxylic acid compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Some examples of common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s- -triazine, dithiocarbamates such as sodium dimethyldithiocarbamate, and a variety of other materials are known in the art for their antimicrobial properties. In some embodiments, the cleaning composition comprises sanitizing agent in an amount effective to provide a desired level of sanitizing. In some embodiments, an antimicrobial component, can be included in the range of up to about 75% by wt. of the composition, up to about 20 wt. %, in the range of about 1.0 wt % to about 20 wt %, in the range of about 5 wt % to about 10 wt %, in the range of about 0.01 to about 1.0 wt. %, or in the range of 0.05 to 0.05% of the composition.

Activators

In some embodiments, the antimicrobial activity or bleaching activity of the rinse aid can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of up to about 75% by wt. of the composition, in some embodiments, in the range of about 0.01 to about 20% by wt, or in some embodiments, in the range of about 0.05 to 10% by wt of the composition. In some embodiments, an activator for an active oxygen compound combines with the active oxygen to form an antimicrobial agent.

Builders or Fillers

The rinse aid can optionally include a minor but effective amount of one or more of a filler which does not necessarily perform as a rinse and/or cleaning agent per se, but may cooperate with a rinse agent to enhance the overall capacity of the composition. Some examples of suitable fillers may include sodium sulfate, sodium chloride, starch, sugars, $C_1$-$C_{10}$ alkylene glycols such as propylene glycol, and the like. In some embodiments, a filler can be included in an amount in the range of up to about 20 wt. %, and in some embodiments, in the range of about 1-15 wt. %.

Anti-Redeposition Agents

The rinse aid composition can optionally include an anti-redeposition agent capable of facilitating sustained suspension of soils in a rinse solution and preventing removed soils from being redeposited onto the substrate being rinsed. Some examples of suitable anti-redeposition agents can include fatty acid amides, fluorocarbon surfactants, complex phosphate esters, styrene maleic anhydride copolymers, and cellulosic derivatives such as hydroxyethyl cellulose, hydroxypropyl cellulose, and the like. A rinse aid composition may include up to about 10 wt. %, and in some embodiments, in the range of about 1 to about 5 wt. %, of an anti-redeposition agent.

Dyes/Odorants

Various dyes, odorants including perfumes, and other aesthetic enhancing agents may also be included in the rinse aid. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

Hardening/Solidification Agents/Solubility Modifiers

In some embodiments, the compositions of the invention are formulated as aqueous liquid rinse aid compositions. In other embodiments, the compositions of the invention are solid rinse aid compositions.

A solid rinse aid may include an effective amount of a hardening agent, as for example, an amide such stearic monoethanolamide or lauric diethanolamide, or an alkylamide, and the like; a solid polyethylene glycol, urea or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the rinse aid and/or other active ingredients may be dispensed from the solid composition over an extended period of time. The composition may include a hardening agent in an amount in the range of up to about 50 wt %. In other embodiments, the hardening agent may be present in amount from about 20 wt % to about 40 wt %, or in the range of about 5 to about 15 wt %.

Functional Polydimethylsiloxones

The composition can also optionally include one or more functional polydimethylsiloxones. For example, in some embodiments, a polyalkylene oxide-modified polydimethylsiloxane, nonionic surfactant or a polybetaine-modified polysiloxane amphoteric surfactant can be employed as an additive. Both, in some embodiments, are linear polysiloxane copolymers to which polyethers or polybetaines have been grafted through a hydrosilation reaction. Some examples of specific siloxane surfactants are known as SILWET® surfactants available from Union Carbide or ABIL® polyether or polybetaine polysiloxane copolymers available from Goldschmidt Chemical Corp., and described in U.S. Pat. No. 4,654,161 which patent is incorporated herein by reference. In some embodiments, the particular siloxanes used can be described as having, e.g., low surface tension, high wetting ability and excellent lubricity. For example, these surfactants are said to be among the few capable of wetting polytetrafluoroethylene surfaces. The siloxane surfactant employed as an additive can be used alone or in combination with a fluorochemical surfactant. In some embodiments, the fluorochemical surfactant employed as an additive optionally in combination with a silane, can be, for example, a nonionic fluorohydrocarbon, for example, fluorinated alkyl polyoxyethylene ethanols, fluorinated alkyl alkoxylate and fluorinated alkyl esters. In some embodiments, the compositions do not include a fluorochemical surfactant.

Further description of such functional polydimethylsiloxones and/or fluorochemical surfactants are described in U.S. Pat. Nos. 5,880,088; 5,880,089; and 5,603,776, all of which patents are incorporated herein by reference. We have found, for example, that the use of certain polysiloxane copolymers in a mixture with hydrocarbon surfactants provide excellent rinse aids on plasticware. We have also found that the combination of certain silicone polysiloxane copolymers and fluorocarbon surfactants with conventional hydrocarbon surfactants also provide excellent rinse aids on plasticware. This combination has been found to be better than the individual components except with certain polyalkylene oxide-modified polydimethylsiloxanes and polybetaine polysiloxane copolymers, where the effectiveness is about equivalent. Therefore, some embodiments encompass the polysiloxane copolymers alone and the combination with the fluorocarbon surfactant can involve polyether polysiloxanes, the nonionic siloxane surfactants. The amphoteric siloxane surfactants, the polybetaine polysiloxane copolymers may be employed alone as the additive in the rinse aids to provide the same results.

In some embodiments, the composition may include functional polydimethylsiloxones in an amount in the range of up to about 10 wt-%. For example, some embodiments may include in the range of about 0.1 to 10 wt-% of a polyalkylene oxide-modified polydimethylsiloxane or a polybetaine-modified polysiloxane, optionally in combination with about 0.1 to 10 wt-% of a fluorinated hydrocarbon nonionic surfactant.

Humectant

The composition can also optionally include one or more humectant. A humectant is a substance having an affinity for water. The humectant can be provided in an amount sufficient to aid in reducing the visibility of a film on the substrate surface. The visibility of a film on substrate surface is a particular concern when the rinse water contains in excess of 200 ppm total dissolved solids. Accordingly, in some embodiments, the humectant is provided in an amount sufficient to reduce the visibility of a film on a substrate surface when the rinse water contains in excess of 200 ppm total dissolved solids compared to a rinse agent composition not containing the humectant. The terms "water solids filming" or "filming" refer to the presence of a visible, continuous layer of matter on a substrate surface that gives the appearance that the substrate surface is not clean.

Some example humectants that can be used include those materials that contain greater than 5 wt. % water (based on dry humectant) equilibrated at 50% relative humidity and room temperature. Exemplary humectants that can be used include glycerin, propylene glycol, sorbitol, alkyl polyglycosides, polybetaine polysiloxanes, and mixtures thereof. In some embodiments, the rinse agent composition can include humectant in an amount in the range of up to about 75% based on the total composition, and in some embodiments, in the range of about 5 wt. % to about 75 wt. % based on the weight of the composition. In some embodiments, where humectant is present, the weight ratio of the humectant to the sheeting agent can be in the range of about 1:3 or greater, and in some embodiments, in the range of about 5:1 and about 1:3.

Other Ingredients

A wide variety of other ingredients useful in providing the particular composition being formulated to include desired properties or functionality may also be included. For example, the rinse aid may include other active ingredients, such as pH buffers, cleaning enzyme, carriers, processing aids, or others, and the like.

Additionally, the rinse aid can be formulated such that during use in aqueous operations, for example in aqueous cleaning operations, the rinse water will have a desired pH. For example, compositions designed for use in rinsing may be formulated such that during use in aqueous rinsing operation the rinse water will have a pH in the range of about 3 to about 5, or in the range of about 5 to about 9. Liquid product formulations in some embodiments have a (10% dilution) pH in the range of about 2 to about 4, or in the range of about 4 to about 9. Techniques for controlling pH at recommended usage levels include the use of buffers, alkali, acids, etc., and are well known to those skilled in the art. One example of a suitable acid for controlling pH includes citric acid. In some embodiments, no additional acid is added to the rinse aid compositions.

Dispensing/Use of the Rinse Aid

In some aspects, the present invention provides methods for rinsing ware in a warewashing application using a rinse aid composition of the present invention. The method can include contacting a selected substrate with the rinse aid composition. The rinse aid can be dispensed as a concentrate or as a use solution. In addition, the rinse aid concentrate can be provided in a solid form or in a liquid form. In general, it is expected that the concentrate will be diluted with water to provide the use solution that is then supplied to the surface of a substrate. In some embodiments, the aqueous use solution may contain about 2,000 parts per million (ppm) or less active materials, or about 1,000 ppm or less active material, or in the range of about 10 ppm to about 500 ppm of active materials, or in the range of about 10 to about 300 ppm, or in the range of about 10 to 200 ppm.

The use solution can be applied to the substrate during a rinse application, for example, during a rinse cycle, for example, in a warewashing machine, a car wash application, or the like. In some embodiments, formation of a use solution can occur from a rinse agent installed in a cleaning machine, for example onto a dish rack. The rinse agent can be diluted and dispensed from a dispenser mounted on or in the machine or from a separate dispenser that is mounted separately but cooperatively with the dish machine.

For example, in some embodiments, liquid rinse agents can be dispensed by incorporating compatible packaging containing the liquid material into a dispenser adapted to diluting the liquid with water to a final use concentration. Some examples of dispensers for the liquid rinse agent of the invention are DRYMASTER-P sold by Ecolab Inc., St. Paul, Minn.

In other example embodiments, solid products, such as cast or extruded solid compositions, may be conveniently dispensed by inserting a solid material in a container or with no enclosure into a spray-type dispenser such as the volume SOL-ET controlled ECOTEMP Rinse Injection Cylinder system manufactured by Ecolab Inc., St. Paul, Minn. Such a dispenser cooperates with a warewashing machine in the rinse cycle. When demanded by the machine, the dispenser directs a spray of water onto the cast solid block of rinse agent which effectively dissolves a portion of the block creating a concentrated aqueous rinse solution which is then fed directly into the rinse water forming the aqueous rinse. The aqueous rinse is then contacted with the dishes to affect a complete rinse. This dispenser and other similar dispensers are capable of controlling the effective concentration of the active portion in the aqueous rinse by measuring the volume of material dispensed, the actual concentration of the material in the rinse water (an electrolyte measured with an electrode) or by measuring the time of the spray on the cast block. In general, the concentration of active portion in the aqueous rinse is preferably the same as identified above for liquid rinse agents. Some other embodiments of spray-type dispenser are disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. An example of a particular product shape is shown in FIG. 9 of U.S. Pat. No. 6,258,765, which is incorporated herein by reference.

In some embodiments, the rinse aid compositions may be formulated for a particular application. In some embodiments, for example, the compositions of the present invention can be formulated for use in aseptic packaging and filing operations. In other embodiments, the rinse aid may be particularly formulated for use in warewashing machines. As discussed above, there are two general types of rinse cycles in commercial warewashing machines. A first type of rinse cycle can be referred to as a hot water sanitizing rinse cycle because of the use of generally hot rinse water (about 180° F.). A second type of rinse cycle can be referred to as a chemical sanitizing rinse cycle and it uses generally lower temperature rinse water (about 120° F.). In some embodiments, the rinse aid compositions of the present invention are used at a temperature of about 180° F.

In some embodiments, it is believed that the rinse aid composition of the invention can be used in a high solids containing water environment in order to reduce the appearance of a visible film caused by the level of dissolved solids provided in the water. In general, high solids containing water is considered to be water having a total dissolved solids (TDS) content in excess of 200 ppm. In certain localities, the service water contains a total dissolved solids content in excess of 400 ppm, and even in excess of 800 ppm. The applications where the presence of a visible film after washing a substrate is a particular problem includes the restaurant or warewashing industry, the car wash industry, and the general cleaning of hard surfaces.

Exemplary articles in the warewashing industry that can be treated with a rinse aid according to the invention include plastics, dishware, cups, glasses, flatware, and cookware. For the purposes of this invention, the terms "dish" and "ware" are used in the broadest sense to refer to various types of articles used in the preparation, serving, consumption, and disposal of food stuffs including pots, pans, trays, pitchers, bowls, plates, saucers, cups, glasses, forks, knives, spoons, spatulas, and other glass, metal, ceramic, plastic composite articles commonly available in the institutional or household kitchen or dining room. In general, these types of articles can be referred to as food or beverage contacting articles because they have surfaces which are provided for contacting food and/or beverage. When used in these warewashing applications, the rinse aid should provide effective sheeting action and low foaming properties. In addition to having the desirable properties described above, it may also be useful for the rinse aid to be biodegradable, environmentally friendly, and generally nontoxic. A rinse aid of this type may be described as being "food grade".

The rinse aid compositions may also be applied to surfaces and objects other than ware, including, but not limited to, medical and dental instruments, and hard surfaces such as vehicle surfaces. The compositions may also be used as wetting agents in a variety of applications for a variety of surfaces, e.g., as wetting agents for aseptic packaging/filling of plastic containers.

EXAMPLES

The present invention is more particularly described in the following examples that are intended as illustrations only. Unless otherwise noted, all parts, percentages, and ratios reported in the following examples are on a weight basis, and all reagents used in the examples were obtained, or are available, from the chemical suppliers described below, or may be synthesized by conventional techniques.

Example 1—Foaming Evaluation

A test was run to determine the foam profiles of several exemplary rinse aids according to the present invention. A Glewwe foam apparatus was used for this test. The following procedure was used. First, each formula was prepared and gently poured into a Glewwe cylinder. Samples tested contained 50 ppm of actives of the rinse aid additive or surfactant combination to be evaluated. A ruler was attached to the side of the cylinder, and the solution was level with the bottom of the ruler. The pump was turned on. Foam height was estimated by reading the average level of foaming according to the ruler. Foam height readings were taken versus time with a stopwatch or timer. The pump was turned off and height of the foam was recorded at various times. Food soil was added after one minute of run time. Each sample was tested at 140° F., at a pressure of 6.0 psi. The foam level was read after one minute of agitation and again after 5 minutes of agitation for a given amount of time. A stable foam remains for several minutes after agitation is stopped. Partially stable foam breaks slowly within a minute. Unstable foam breaks rapidly in less than 15 seconds. A desirable rinse aid should have unstable foam to no foam.

The table below shows the surfactants tested, and their corresponding class in this study.

TABLE 1

| Surfactant | Class |
|---|---|
| Genapol EP-2454 ® (commercially available from Clariant) | Association Disruption Agent |
| Plurafac LF-221 ® (commercially available from BASF) | Association Disruption Agent |
| Plurafac LF-500 ® (commercially available from BASF) | Association Disruption Agent |
| Neodol 45-13 ® | Sheeting Agent |
| Pluronic ® 25R2 (commercially available from BASF) | Defoaming Agent |
| Dehypon ® LS-54 (commercially available from Cognis) | Association Disruption Agent |
| Novel ® 1012GB-21 (commercially available from Sasol) | Sheeting Agent |

The results from the foaming test are shown in the table below.

TABLE 2

| | Ratio of | After 1 min. (total) run time | | | After 5 min. (total) run time after addition of food soil | | |
|---|---|---|---|---|---|---|---|
| Product | Surfactant | Initial | 15 Sec. | 1 Min. | Initial | 15 Sec. | 1 Min. |
| Genapol/LF-221/Neodol 45-13/25R2 | equal parts | 2 | 1 | ¼ | 6 | 5 | 4½ |
| Genapol/Dehypon/LF-221/LF-500 | equal parts | 0 | 0 | 0 | 3 | ¼ | ¼ |
| Genapol/LF-221/Neodol 45-13 | equal parts | 6 | 4½ | 2 | 11 | 10 | 8 |
| Neodol 45-13/LF-221/LF-500 | equal parts | 5 | 4½ | 2 | 10 | 9 | 8 |
| Neodol 45-13/LF-221/LF-500/Genapol | equal parts | 4 | 3 | ½ | 9 | 8 | 7 |
| Genapol/LF-221/Novel/25R2 | equal parts | Trace | 0 | 0 | 3 | ¼ | ¼ |
| Genapol/LF-221/Novel/(2)25R2 | 1/1/1/2 | 0 | 0 | 0 | 2½ | <⅛ | <⅛ |
| Genapol/LF-221/Novel/(3)25R2 | 1/1/1/3 | 0 | 0 | 0 | 2 | <⅛ | <⅛ |
| Genapol/Dehypon/LF-221/LF-500 | equal parts | 0 | 0 | 0 | 3 | ¼ | ¼ |
| Genapol/Dehypon/LF-221/LF-500/25R2 | equal parts | 0 | 0 | 0 | 2½ | ¼ | ¼ |
| Genapol/Dehypon/LF-221/LF-500/(2)25R2 | 1/1/1/1/2 | 0 | 0 | 0 | | | |
| Genapol/LF-221/Novel | equal parts | Trace | Trace | Trace | 6½ | 5½ | 2½ |
| Novel/LF-221/LF-500 | equal parts | Trace | 0 | 0 | 4½ | 2 | ½ |
| Novel/LF-221/LF-500/25R2 | equal parts | 0 | 0 | 0 | 3 | ¼ | ¼ |
| Novel/LF-221/LF-500/(2)25R2 | 1/1/1/2 | 0 | 0 | 0 | 2 | Trace | Trace |
| Novel/LF-221/LF-500/Genapol | equal parts | Trace | 0 | 0 | 4½ | 1 | ½ |
| Novel/LF-221/LF-500/Genapol/25R2 | equal parts | 0 | 0 | 0 | 2¾ | ¼ | ¼ |
| Novel/LF-221/LF-500/Genapol/(2)25R2 | 1/1/1/2 | 0 | 0 | 0 | 2¼ | ¼ | ¼ |

As can be seen from this table, Novell® 1012GB-21 was superior to Neodol 45-13 as a sheeting agent type surfactant. All of the surfactant combinations tested that included the Neodol surfactant had an excess of foam. No combination of association disruption agent or defoaming agent was effective at defoaming the Neodol surfactant for a rinse aid application. It was also found that association disruption agents were not able to defoam the sheeting agents alone. Rather, a combination of defoaming agent, and association disruption agent was necessary to effectively defoam the sheeting agents tested.

Example 2—Sheeting Performance

For this test, a number of rinse aid formulations were tested for sheeting performance and for the forming of stable foam during use in an aqueous rinse. Four comparative compositions (Comparative Compositions A, B, C, and D) were prepared along with exemplary rinse aid formulations according to the present invention (Composition 1 and 2). Compositions 3 and 4 were also prepared. Composition 3 included three association disruption agents, and no sheeting agent or defoaming agents. Composition 4 included three association disruption agents and a sheeting agent, but no defoaming agent. The comparative compositions were formed using the components in the weight percents shown in the table below.

TABLE 3

| Component | Comparative Composition A | Comparative Composition B | Comparative Composition C |
|---|---|---|---|
| Abil B 9950[1] | 2.0% | | |
| Propylene Glycol | 3.0% | | |
| LD-097[2] | 26.155% | 64.6223% | |
| D-097[3] | 9.65% | 9.0% | |
| Neodol 45-13[4] | 2.5% | | |
| Neodol 24-12[5] | | 3.0% | |
| Pluronic ® 25R2[6] | | | 4.196% |
| Novel ® 1012GB-21[7] | | | 4.196% |

[1]Dimethicone Propyl PG-Betaine, 30%
[2]Polyoxypropylene Polyoxyethylene Block Copolymer
[3]Polyoxypropylene Polyoxyethylene Block Copolymer
[4]Linear Alcohol $C_{14-15}$, Alcohol 13 mole Ethoxylate
[5]Linear Alcohol 13 mole Ethoxylate
[6]Long chain EO/PO block copolymer
[7]Alcohol long chain ethoxylate Comparative Composition D was a commercially available rinse aid product, Suma Select®, available from Johnson Diversey.

The rinse aid formulations including components according to the present invention were formed using the components in the weight percents shown in the table below.

TABLE 4

| Components | Type of Agent | Composition 1 | Composition 2 | Composition 3 | Composition 4 |
|---|---|---|---|---|---|
| Pluronic ® 25R2 | Defoaming Agent | 3.68% | 8% | | |
| Plurafac LF-221[8] | Association Disruption Agent | 3.68% | 4% | 8% | 6% |
| Plurafac LF-500[9] | Association Disruption Agent | 7.0% | 4% | 8% | 8% |
| Novel ® 1012GB-21 | Sheeting Agent | 2.66% | 4% | | 4% |
| Genapol EP-2454[10] | Association Disruption Agent | 7.0% | 4% | 8% | 6% |

[8]Compact alcohol EO/PO
[9]Compact alcohol EO/PO
[10]Compact alcohol EO/PO

For the sheeting evaluation, a number of warewash materials were exposed to the rinse aid formulations during a series of 30 second cycles using 160° F. water or 120° F. and 140° F. water for low temperature evaluations. The ware wash materials were meticulously cleaned prior to the test and then soiled with a solution containing a 0.2% hotpoint soil, which is a mixture of powder milk and margarine. The amount of each rinse aid formulation that was used during the wash cycles is shown in the table as parts per million active surfactant.

Immediately after the ware wash materials were exposed to the rinse aid formulations, the appearance of the water draining off of the individual ware wash materials (sheeting) was examined and evaluated. The tables below show the results of these tests. In these tables, the sheeting evaluation is indicated by either a single line (-) signifying no sheeting the number "one" (1) signifying pin point sheeting or a X sign (X) signifying complete sheeting. The test was complete when all of the ware wash materials were completely sheeted.

The foam level in the machine was also noted. Generally, stable foam at any level is unacceptable. Foam that is less than one half of an inch and that is unstable and breaks to nothing soon after the machine is shut off is acceptable, but no foam is best.

TABLE 5

| Comparative Composition A | | | | | | | | | |
|---|---|---|---|---|---|---|---|---|---|
| | Active Surfactant, ppm | | | | | | | | |
| | 40 | 50 | 60 | 70 | 80 | 90 | 100 | 110 | 120 |
| Polycarbonate Tile (clear) New | — | — | — | — | — | — | 1 | 1 | 1 |
| Glass tumbler | 1 | 1 | 1 | X | X | X | X | X | X |
| China Plate | 1 | 1 | X | X | X | X | X | X | X |
| Melamine Plate | 1 | 1 | X | X | X | X | X | X | X |

TABLE 5-continued

| Comparative Composition A | | | | | | | | | |
|---|---|---|---|---|---|---|---|---|---|
| Polypropylene Cup (yellow) | — | — | — | — | — | 1 | 1 | 1 | 1 |
| Dinex Bowl (blue) | — | — | — | — | 1 | 1 | 1 | 1 | 1 |
| Polypropylene Jug (blue) | — | — | — | — | 1 | 1 | 1 | 1 | 1 |
| Polysulfonate Dish (clear tan) | — | — | — | — | 1 | 1 | 1 | 1 | 1 |
| Stainless Steel Knife | — | — | 1 | 1 | X | X | X | X | X |
| Polypropylene tray (peach) New | — | — | — | — | — | 1 | 1 | 1 | 1 |
| Fiberglass tray (tan) New | — | 1 | 1 | 1 | 1 | 1 | X | X | X |
| Stainless steel slide 316 New | 1 | 1 | 1 | 1 | X | X | X | X | X |
| Temperature, ° F. | 157 | 157 | 157 | 157 | 157 | 157 | 157 | 157 | 157 |
| Suds | None | None | None | None | None | None | None | None | None |

| | Active Surfactant, ppm | | | | | | | |
|---|---|---|---|---|---|---|---|---|
| | 130 | 140 | 150 | 160 | 170 | 180 | 190 | 200 |
| Polycarbonate Tile (clear) New | 1 | 1 | X | X | X | X | X | X |
| Glass tumbler | X | X | X | X | X | X | X | X |
| China Plate | X | X | X | X | X | X | X | X |
| Melamine Plate | X | X | X | X | X | X | X | X |
| Polypropylene Cup (yellow) | 1 | 1 | 1 | 1 | 1 | X | X | X |
| Dinex Bowl (blue) | 1 | 1 | 1 | 1 | X | X | X | X |
| Polypropylene Jug (blue) | 1 | 1 | 1 | 1 | X | X | X | X |
| Polysulfonate Dish (clear tan) | 1 | X | X | X | X | X | X | X |
| Stainless Steel Knife | X | X | X | X | X | X | X | X |
| Polypropylene tray (peach) New | 1 | 1 | 1 | 1 | 1 | 1 | 1 | 1 |
| Fiberglass tray (tan) New | X | X | X | X | X | X | X | X |
| Stainless steel slide 316 New | X | X | X | X | X | X | X | X |
| Temperature, ° F. | 157 | 157 | 157 | 157 | 157 | 157 | 157 | 157 |
| Suds | None | None | None | None | None | None | None | None |

TABLE 6

| Comparative Composition B | | | | | | | | | |
|---|---|---|---|---|---|---|---|---|---|
| | Active Surfactant, ppm | | | | | | | | |
| | 40 | 50 | 60 | 70 | 80 | 90 | 100 | 110 | 120 |
| Polycarbonate Tile (clear) New | — | — | — | — | — | — | — | — | 1 |
| Glass tumbler | — | — | 1 | 1 | 1 | 1 | 1 | X | X |
| China Plate | — | — | 1 | 1 | 1 | 1 | 1 | X | X |
| Melamine Plate | — | — | 1 | 1 | 1 | 1 | 1 | X | X |
| Polypropylene Cup (yellow) | — | — | — | — | — | — | — | 1 | 1 |
| Dinex Bowl (blue) | — | — | — | — | — | — | 1 | 1 | 1 |
| Polypropylene Jug (blue) | — | — | — | — | — | — | 1 | 1 | X |
| Polysulfonate Dish (clear tan) | — | — | — | — | — | — | 1 | 1 | X |
| Stainless Steel Knife | — | — | — | — | 1 | 1 | 1 | X | X |
| Polypropylene tray (peach) New | — | — | — | — | — | 1 | 1 | 1 | 1 |
| Fiberglass tray (tan) New | — | — | — | — | 1 | 1 | 1 | 1 | 1 |
| Stainless steel slide 316 New | — | — | 1 | 1 | 1 | 1 | 1 | 1 | X |

TABLE 6-continued

| Comparative Composition B | | | | | | | | | |
|---|---|---|---|---|---|---|---|---|---|
| Temperature, ° F. | 157 | 157 | 157 | 157 | 157 | 157 | 157 | 157 | 157 |
| Suds | None | None | None | None | None | None | None | None | None |

| | Active Surfactant, ppm | | | | | | | |
|---|---|---|---|---|---|---|---|---|
| | 130 | 140 | 150 | 160 | 170 | 180 | 190 | 200 |
| Polycarbonate Tile (clear) New | 1 | 1 | 1 | X | X | X | X | X |
| Glass tumbler | X | X | X | X | X | X | X | X |
| China Plate | X | X | X | X | X | X | X | X |
| Melamine Plate | X | X | X | X | X | X | X | X |
| Polypropylene Cup (yellow) | X | X | X | X | X | X | X | X |
| Dinex Bowl (blue) | X | X | X | X | X | X | X | X |
| Polypropylene Jug (blue) | X | X | X | X | X | X | X | X |
| Polysulfonate Dish (clear tan) | X | X | X | X | X | X | X | X |
| Stainless Steel Knife | X | X | X | X | X | X | X | X |
| Polypropylene tray (peach) New | 1 | 1 | 1 | 1 | 1 | 1 | 1 | 1 |
| Fiberglass tray (tan) New | 1 | X | X | X | X | X | X | X |
| Stainless steel slide 316 New | X | X | X | X | X | X | X | X |
| Temperature, ° F. | 157 | 157 | 157 | 157 | 157 | 157 | 157 | 157 |
| Suds | None | None | None | None | None | None | None | None |

TABLE 7

| Comparative Composition C | | | | | | | | | |
|---|---|---|---|---|---|---|---|---|---|
| | Active Surfactant, ppm | | | | | | | | |
| | 40 | 50 | 60 | 70 | 80 | 90 | 100 | 110 | 120 |
| Polycarbonate Tile (clear) New | | | | | | 1 | 1 | 1 | 1 |
| Glass tumbler | | | | 1 | | 1 | 1 | X | X |
| China Plate | | | 1 | 1 | 1 | 1 | 1 | 1 | X |
| Melamine Plate | | | 1 | 1 | 1 | 1 | 1 | 1 | 1 |
| Polypropylene Cup (yellow) | | | | | | 1 | 1 | 1 | 1 |
| Dinex Bowl (blue) | | | | | | 1 | 1 | 1 | 1 |
| Polypropylene Jug (blue) | | | | | | | 1 | 1 | 1 |
| Polysulfonate Dish (clear tan) | | | 1 | 1 | 1 | 1 | 1 | 1 | 1 |
| Stainless Steel Knife | | | 1 | 1 | 1 | 1 | 1 | 1 | X |
| Polypropylene tray (peach) New | | | | | | | Water droplets never pinhole sheeted | | |
| Fiberglass tray (tan) New | | | | 1 | 1 | 1 | 1 | 1 | X |
| Stainless steel slide 316 New | | | | 1 | 1 | X | X | X | X |
| Temperature, ° F. | 157 | 157 | 157 | 157 | 157 | 157 | 157 | 157 | 157 |
| Suds | None | None | None | None | None | None | None | None | None |

| | Active Surfactant, ppm | | | | | | | |
|---|---|---|---|---|---|---|---|---|
| | 130 | 140 | 150 | 160 | 170 | 180 | 190 | 200 |
| Polycarbonate Tile (clear) New | X | X | | | | | | |
| Glass tumbler | X | X | | | | | | |
| China Plate | X | X | | | | | | |
| Melamine Plate | X | X | | | | | | |
| Polypropylene Cup (yellow) | 1 | X | | | | | | |
| Dinex Bowl (blue) | 1 | X | | | | | | |

TABLE 7-continued

| Comparative Composition C | | | | | | | | |
|---|---|---|---|---|---|---|---|---|
| Polypropylene Jug (blue) | 1 | X | | | | | | |
| Polysulfonate Dish (clear tan) | 1 | X | | | | | | |
| Stainless Steel Knife | X | X | | | | | | |
| Polypropylene tray (peach) New | | Water droplets never pinhole sheeted | | | | | | |
| Fiberglass tray (tan) New | X | X | | | | | | |
| Stainless steel slide 316 New | X | X | | | | | | |
| Temperature, ° F. | 157 | 157 | 157 | 157 | 157 | 157 | 157 | 157 |
| Suds | None | None | None | None | None | None | None | None |

TABLE 8

| Comparative Composition D | | | | | | | | | |
|---|---|---|---|---|---|---|---|---|---|
| | Active Surfactant, ppm | | | | | | | | |
| | 40 | 50 | 60 | 70 | 80 | 90 | 100 | 110 | 120 |
| Polycarbonate Tile (clear) New | | | | | | 1 | 1 | 1 | 1 |
| Glass tumbler | | | | | | | 1 | 1 | 1 |
| China Plate | | | 1 | 1 | 1 | 1 | 1 | 1 | 1 |
| Melamine Plate | | | 1 | 1 | 1 | 1 | 1 | X | X |
| Polypropylene Cup (yellow) | | | | | | | | 1 | 1 |
| Dinex Bowl (blue) | | | | | | | | 1 | 1 |
| Polypropylene Jug (blue) | | | | | | | | 1 | 1 |
| Polysulfonate Dish (clear tan) | | | | | | 1 | 1 | 1 | 1 |
| Stainless Steel Knife | | | | | 1 | 1 | 1 | 1 | 1 |
| Polypropylene tray (peach) New | | | | | | | Water droplets never pinhole sheeted | | |
| Fiberglass tray (tan) New | | | | 1 | 1 | 1 | 1 | 1 | 1 |
| Stainless steel slide 316 New | X | X | X | X | X | X | X | X | X |
| Temperature, ° F. | 157 | 157 | 157 | 157 | 157 | 157 | 157 | 157 | 157 |
| Suds | None | None | None | None | None | None | None | None | None |

| | Active Surfactant, ppm | | | | | | | |
|---|---|---|---|---|---|---|---|---|
| | 130 | 140 | 150 | 160 | 170 | 180 | 190 | 200 |
| Polycarbonate Tile (clear) New | 1 | 1 | 1 | 1 | 1 | X | X | X |
| Glass tumbler | 1 | 1 | X | X | X | X | X | X |
| China Plate | 1 | 1 | 1 | 1 | 1 | 1 | 1 | 1 |
| Melamine Plate | X | X | X | X | X | X | X | X |
| Polypropylene Cup (yellow) | 1 | 1 | 1 | X | X | X | X | X |
| Dinex Bowl (blue) | 1 | X | X | X | X | X | X | X |
| Polypropylene Jug (blue) | X | X | X | X | X | X | X | X |
| Polysulfonate Dish (clear tan) | 1 | 1 | 1 | 1 | 1 | X | X | X |
| Stainless Steel Knife | 1 | 1 | 1 | 1 | 1 | 1 | X | X |
| Polypropylene tray (peach) New | | Water droplets never pinhole sheeted | | | | | | |
| Fiberglass tray (tan) New | 1 | 1 | 1 | 1 | X | X | X | X |
| Stainless steel slide 316 New | X | X | X | X | X | X | X | X |
| Temperature, ° F. | 157 | 157 | 157 | 157 | 157 | 157 | 157 | 157 |
| Suds | None | None | None | None | None | None | None | None |

TABLE 9

| Composition 1 | | | | | | | | | |
|---|---|---|---|---|---|---|---|---|---|
| | Active Surfactant, ppm | | | | | | | | |
| | 40 | 50 | 60 | 70 | 80 | 90 | 100 | 110 | 120 |
| Polycarbonate Tile (clear) New | — | — | — | — | — | 1 | 1 | X | X |
| Glass tumbler | — | 1 | 1 | X | X | X | X | X | X |
| China Plate | X | X | X | X | X | X | X | X | X |
| Melamine Plate | X | X | X | X | X | X | X | X | X |
| Polypropylene Cup (yellow) | — | — | — | — | — | 1 | 1 | 1 | X |
| Dinex Bowl (blue) | — | — | — | — | — | 1 | 1 | 1 | X |
| Polypropylene Jug (blue) | — | — | — | — | — | — | — | 1 | X |
| Polysulfonate Dish (clear tan) | — | — | — | 1 | 1 | X | X | X | X |
| Stainless Steel Knife | — | — | — | — | — | 1 | 1 | X | X |
| Polypropylene tray (peach) New | — | — | — | — | — | — | 1 | X | X |
| Fiberglass tray (tan) New | — | — | — | 1 | 1 | 1 | X | X | X |
| Stainless steel slide 316 New | — | 1 | 1 | 1 | 1 | 1 | X | X | X |
| Temperature, ° F. | 157 | 157 | 157 | 157 | 157 | 157 | 157 | 157 | 157 |
| Suds | none | none | none | none | none | none | none | none | none |

TABLE 10

| Composition 2 | | | | | | | | | |
|---|---|---|---|---|---|---|---|---|---|
| | Active Surfactant, ppm | | | | | | | | |
| | 40 | 50 | 60 | 70 | 80 | 90 | 100 | 110 | 120 |
| Polycarbonate Tile (clear) New | | | | 1 | 1 | 1 | 1 | X | |
| Glass tumbler | | | | 1 | X | X | X | X | |
| China Plate | 1 | 1 | 1 | 1 | 1 | X | X | X | |
| Melamine Plate | 1 | 1 | 1 | 1 | 1 | 1 | X | X | |
| Polypropylene Cup (yellow) | | | | | | 1 | 1 | X | |
| Dinex Bowl (blue) | | | | | | 1 | 1 | X | |
| Polypropylene Jug (blue) | | | | | | | 1 | X | |
| Polysulfonate Dish (clear tan) | | | 1 | 1 | 1 | 1 | 1 | X | |
| Stainless Steel Knife | | | X | X | X | X | X | X | |
| Polypropylene tray (peach) New | | | | | | Water droplets never pinhole sheeted | | | |
| Fiberglass tray (tan) New | | | | 1 | 1 | 1 | 1 | X | |
| Stainless steel slide 316 New | X | X | X | X | X | X | X | X | |
| Temperature, ° F. | 157 | 157 | 157 | 157 | 157 | 157 | 157 | 157 | 157 |
| Suds | None | None | None | None | None | None | None | None | None |

| | Active Surfactant, ppm | | | | | | | |
|---|---|---|---|---|---|---|---|---|
| | 130 | 140 | 150 | 160 | 170 | 180 | 190 | 200 |
| Polycarbonate Tile (clear) New | | | | | | | | |
| Glass tumbler | | | | | | | | |
| China Plate | | | | | | | | |
| Melamine Plate | | | | | | | | |
| Polypropylene Cup (yellow) | | | | | | | | |
| Dinex Bowl (blue) | | | | | | | | |
| Polypropylene Jug (blue) | | | | | | | | |
| Polysulfonate Dish | | | | | | | | |

TABLE 10-continued

| Composition 2 | | | | | | | | |
|---|---|---|---|---|---|---|---|---|
| (clear tan) | | | | | | | | |
| Stainless Steel Knife | | | | | | | | |
| Polypropylene tray (peach) New | Water droplets never pinhole sheeted | | | | | | | |
| Fiberglass tray (tan) New | | | | | | | | |
| Stainless steel slide 316 New | | | | | | | | |
| Temperature, ° F. | 157 | 157 | 157 | 157 | 157 | 157 | 157 | 157 |
| Suds | None | None | None | None | None | None | None | None |

TABLE 11

| Composition 3 | Active Surfactant, ppm | | | | | | | | | | | | | | | | |
|---|---|---|---|---|---|---|---|---|---|---|---|---|---|---|---|---|---|
| | 40 | 50 | 60 | 70 | 80 | 90 | 100 | 110 | 120 | 130 | 140 | 150 | 160 | 170 | 180 | 190 | 200 |
| Polycarbonate Tile (clear) New | | | | | | | | 1 | 1 | 1 | 1 | 1 | 1 | 1 | 1 | 1 | 1 |
| Glass tumbler | | | | | | | | 1 | 1 | 1 | 1 | 1 | 1 | 1 | 1 | 1 | 1 |
| China Plate | | | | 1 | 1 | 1 | 1 | 1 | 1 | 1 | 1 | 1 | 1 | 1 | 1 | 1 | 1 |
| Melamine Plate | | | | 1 | 1 | 1 | 1 | 1 | 1 | 1 | 1 | 1 | 1 | 1 | 1 | 1 | 1 |
| Polypropylene Cup (yellow) | | | | | | | | | | 1 | 1 | 1 | 1 | 1 | 1 | 1 | 1 |
| Dinex Bowl (blue) | | | | | | | | | | | | 1 | 1 | 1 | 1 | 1 | 1 |
| Polypropylene Jug (blue) | | | | | | | | | | 1 | 1 | 1 | 1 | 1 | 1 | 1 | 1 |
| Polysulfonate Dish (clear tan) | | | | | | 1 | 1 | 1 | 1 | 1 | 1 | 1 | 1 | 1 | 1 | 1 | 1 |
| Stainless Steel Knife | | | | | | 1 | 1 | 1 | 1 | 1 | 1 | 1 | 1 | 1 | 1 | 1 | 1 |
| Polypropylene tray (peach) New | Water droplets never pinhole sheeted | | | | | | | | | | | | | | | | |
| Fiberglass tray (tan) New | | | | 1 | 1 | 1 | 1 | 1 | 1 | 1 | 1 | 1 | 1 | 1 | 1 | 1 | 1 |
| Stainless steel slide 316 New | | | | 1 | 1 | 1 | 1 | 1 | 1 | 1 | 1 | 1 | 1 | 1 | 1 | 1 | 1 |
| Temperature, ° F. | 157 | 157 | 157 | 157 | 157 | 157 | 157 | 157 | 157 | 157 | 157 | 157 | 157 | 157 | 157 | 157 | 157 |
| Suds | None | None | None | None | None | None | None | None | None | None | None | None | None | None | None | None | None |

TABLE 12

| Composition 4 | Active Surfactant, ppm | | | | | | | | | | | | | | | | |
|---|---|---|---|---|---|---|---|---|---|---|---|---|---|---|---|---|---|
| | 40 | 50 | 60 | 70 | 80 | 90 | 100 | 110 | 120 | 130 | 140 | 150 | 160 | 170 | 180 | 190 | 200 |
| Polycarbonate Tile (clear) New | | | | | | | | | | | 1 | 1 | 1 | 1 | 1 | 1 | 1 |
| Glass tumbler | | | | | | | | | 1 | 1 | 1 | 1 | 1 | 1 | 1 | 1 | 1 |
| China Plate | | | | | | | 1 | 1 | 1 | 1 | 1 | 1 | 1 | 1 | 1 | 1 | 1 |
| Melamine Plate | | | | | | | 1 | 1 | 1 | 1 | 1 | 1 | 1 | 1 | 1 | 1 | 1 |
| Polypropylene Cup (yellow) | | | | | | | | | | | 1 | 1 | 1 | 1 | 1 | 1 | 1 |
| Dinex Bowl (blue) | | | | | | | | | | | 1 | 1 | 1 | 1 | 1 | 1 | 1 |
| Polypropylene Jug (blue) | | | | | | | | | | | 1 | 1 | 1 | 1 | 1 | 1 | 1 |
| Polysulfonate Dish (clear tan) | | | | | | 1 | 1 | 1 | 1 | 1 | 1 | 1 | 1 | 1 | 1 | 1 | 1 |
| Stainless Steel Knife | | | | | | 1 | 1 | 1 | 1 | 1 | 1 | 1 | 1 | 1 | 1 | 1 | 1 |
| Polypropylene tray (peach) New | Water droplets never pinhole sheeted | | | | | | | | | | | | | | | | |
| Fiberglass tray (tan) New | | | | | | 1 | 1 | 1 | 1 | 1 | 1 | 1 | 1 | 1 | 1 | 1 | 1 |

TABLE 12-continued

| Composition 4 | | | | | | | | | | | | | | | | | |
|---|---|---|---|---|---|---|---|---|---|---|---|---|---|---|---|---|---|
| | Active Surfactant, ppm | | | | | | | | | | | | | | | | |
| | 40 | 50 | 60 | 70 | 80 | 90 | 100 | 110 | 120 | 130 | 140 | 150 | 160 | 170 | 180 | 190 | 200 |
| Stainless steel slide 316 New | | | | 1 | 1 | 1 | 1 | 1 | 1 | 1 | 1 | 1 | 1 | 1 | 1 | 1 | 1 |
| Temperature, ° F. | 157 | 157 | 157 | 157 | 157 | 157 | 157 | 157 | 157 | 157 | 157 | 157 | 157 | 157 | 157 | 157 | 157 |
| Suds | None | None | None | None | None | None | None | None | None | None | None | None | None | None | None | None | None |

As can be seen from these results, Compositions 1 and 2, exemplary compositions of the present invention, resulted in complete sheeting and no foam at 120 ppm on every article tested. None of the comparative compositions resulted in complete sheeting on every surface tested, even when used at 200 ppm active surfactant level. Thus, it was shown that the present exemplary rinse aid resulted in complete sheeting when used at a 40% less active surfactant level than two standard comparative rinse aids.

Further, it was shown that Composition 1 resulted in complete sheeting of the polypropylene tray at 120 ppm, and none of the comparative compositions resulted in complete sheeting of this article.

Example 3—Contact Angle Test

A test was run to measure the angle at which a drop of solution contacts a test substrate, i.e., the contact angle. For this test, the following rinse aid compositions were tested. Composition 1 was an exemplary rinse aid of the present invention. Comparative Compositions A, B, C, and D were the same as those tested in Example 2, the formulations of which are shown in the table below.

TABLE 13

| Component | Comparative Composition A | Comparative Composition B | Comparative Composition C | Composition 1 |
|---|---|---|---|---|
| Abil B 9950[1] | 2.0% | | | |
| Propylene Glycol | 3.0% | | | |
| LD-097[2] | 26.155% | 64.6223% | | |
| D-097[3] | 9.65% | 9.0% | | |
| Neodol 145-3[4] | 2.5% | | | |
| Neodol 24-12[5] | | 3.0% | | |
| Pluronic ® 25R2[6] | | | 4.196% | 3.68% |

TABLE 13-continued

| Component | Comparative Composition A | Comparative Composition B | Comparative Composition C | Composition 1 |
|---|---|---|---|---|
| Plurafac LF-221[7] | | | | 3.68% |
| Plurafac LF-500[8] | | | | 7.0% |
| Novel ® 1012GB-21[9] | | | 4.196% | 2.66% |
| Genapol EP-2454[10] | | | | 7.0% |

[1]Dimethicone Propyl PG-Betaine, 30%
[2]Polyoxypropylene Polyoxyethylene Block Copolymer
[3]Polyoxypropylene Polyoxyethylene Block Copolymer
[4]Linear Alcohol $C_{14-15}$, 13 mole Ethoxylate
[5]Linear Alcohol 13 mole Ethoxylate
[6]Long chain EO/PO block copolymer
[7]Compact alcohol EO/PO
[8]Compact alcohol EO/PO
[9]Alcohol long chain ethoxylate
[10]Compact alcohol EO/PO Comparative Composition D was also tested, and was the same as described above in Example 2. Comparative Composition E included 24% Dehypon® LS-54 as a rinse aid active.

After each of the compositions was prepared, the compositions were placed into an apparatus where a single drop of the composition was delivered to a test substrate. Test substrates used in this test included a polypropylene tray, a polypropylene coupon, a polycarbonate coupon, a melamine coupon, a glass coupon, a stainless steel 316 coupon and a fiberglass tray. The deliverance of the drop to the substrate was recorded by a camera. The video captured by the camera was sent to a computer were the contact angle was be determined. Without wishing to be bound by any particular theory, it is thought that the lower the contact angle the better the solution will induce sheeting. Increased sheeting is thought to lead to the dishware drying more quickly and with fewer spots once it has been removed from the dish machine. The results from this test are shown below.

TABLE 14

| Surface | Composition 1 | Comparative Composition A | Comparative Composition B | Comparative Composition D | Comparative Composition E | Comparative Composition F |
|---|---|---|---|---|---|---|
| Polypropylene Tray (New) | 21.84° | 52.436° | 51.02° | 46.20° | 31.71° | 43.484° |
| Polypropylene coupon | 18.31° | 44.28° | 49.212° | 41.82° | 26.78° | 44.71° |
| Polycarbonate | 21.82° | 56.54° | 52.98° | 48.65° | 28.52° | 48.23° |
| Melamine | 21.8° | 54.62° | 52.65° | 45.87° | 45.41° | 47.32° |
| Glass | 15.13° | 34.91° | 37.90° | 27.52° | 26.20° | 33.91° |

TABLE 14-continued

| Surface | Composition 1 | Comparative Composition A | Comparative Composition B | Comparative Composition D | Comparative Composition E | Comparative Composition F |
|---|---|---|---|---|---|---|
| Stainless steel 316 | 27.98° | 56.74° | 64.97° | 52.79° | 39.26° | 53.73° |
| Fiberglass tray (New) | 25.39° | 49.33° | 53.19° | 48.64° | 39.40° | 54.17° |

As can be seen from these results, the exemplary composition according to the present invention, Composition 1, resulted in significantly lower contact angles on a variety of substrates. This was especially seen on the plastic substrates (polypropylene tray, and coupon). The contact angle of Composition 1 on the polypropylene tray was less than 50% of that of Comparative Compositions A, B, D, and F, and was significantly lower than that of Comparative Composition E.

Example 4—Contact Angle Test

Another contact angle test was run using the procedure described in Example 3. For this test however, the contact angle on polycarbonate, polypropylene and fiberglass surfaces, for individual surfactants, as well as combinations thereof were measured. FIG. 1 shows the results of this test.

As can be seen from this figure, Novel 1012GB-251 had a poor (high) contact angle on plastic surfaces (almost 60°). The Pluronic® 25R2 had a slightly better, but still moderately poor contact angle on plastic surfaces (near 50°). However, a combination of these two surfactants (50/50 Novel 1012GB-251 and Surfonic® POA-25R2) showed a synergistic lowering of contact angle on plastic surfaces (about 40°).

It was also seen that the association disruption class of surfactants were comparatively good wetting agents. This class of surfactants generally had contact angles in the 40°.

As can also be seen in this figure, synergistic results were shown when combinations of all three types of surfactants were used. An exemplary fast drying rinse aid according to the present invention ("FDRA #4" on the graph), showed a much lower contact angle than the other surfactants, and surfactant combinations tested, with a contact angle of about 22°.

Example 5—Viscoelasticity Test

A study was performed to measure the viscoelasticity of exemplary rinse aid compositions of the present invention and comparative rinse aid compositions. Without wishing to be bound by any particular theory, it is thought that the thin-film viscoelasticity of a rinse solution is related to the overall sheeting, draining and drying of the rinse aid liquid on the substrates to which they are applied. It is thought that a certain elasticity is important for the liquid to generally hold the "sheets." However, too high a level of elasticity can hinder drainage and drying of the rinse aid from the substrate.

The viscoelasticity measurements for this study were taken using a Bohlin CVO 120 HR NF Rheometer. The measurements were taken for neat or high concentration solutions (in case the 100% material is a solid at room temperature) of individual surfactants, and combinations of surfactants. The measurements are measured in the linear viscoelastic range. The data plotted were G' and G" versus strain. G' is the elastic component of the complex modulus, and G" is the viscous component of the complex modulus. The association effect of the surfactant molecules was studied. The results of this study are shown in FIGS. 2*a* through 2*g*. In these figures, the x-axis depicts the strain. In this example, strain is a ratio of two lengths and has no units. It is defined by the formula shown below:

$$\text{Shear strain}=\delta u/h.$$

In these figures, the y-axis is shows units of pascal ("Pa"). The pascal is the SI derived unit of pressure, stress, Young's Modulus and tensile stress. It is a measure of force per unit area, i.e., equivalent to one newton per square meter.

As can be seen from these figures, an exemplary sheeting agent surfactant, Novel 1012GB-21, had a large G' and G", which suggests a strong association effect. An exemplary defoaming agent surfactant tested, Pluronic® 25R2, had a large G', but a low G". A 50/50 combination of these surfactants (FIG. 2C) showed a large G' and G", which showed a strong association effect that was not broken down by the mixing of the two surfactants.

Figure 2A:
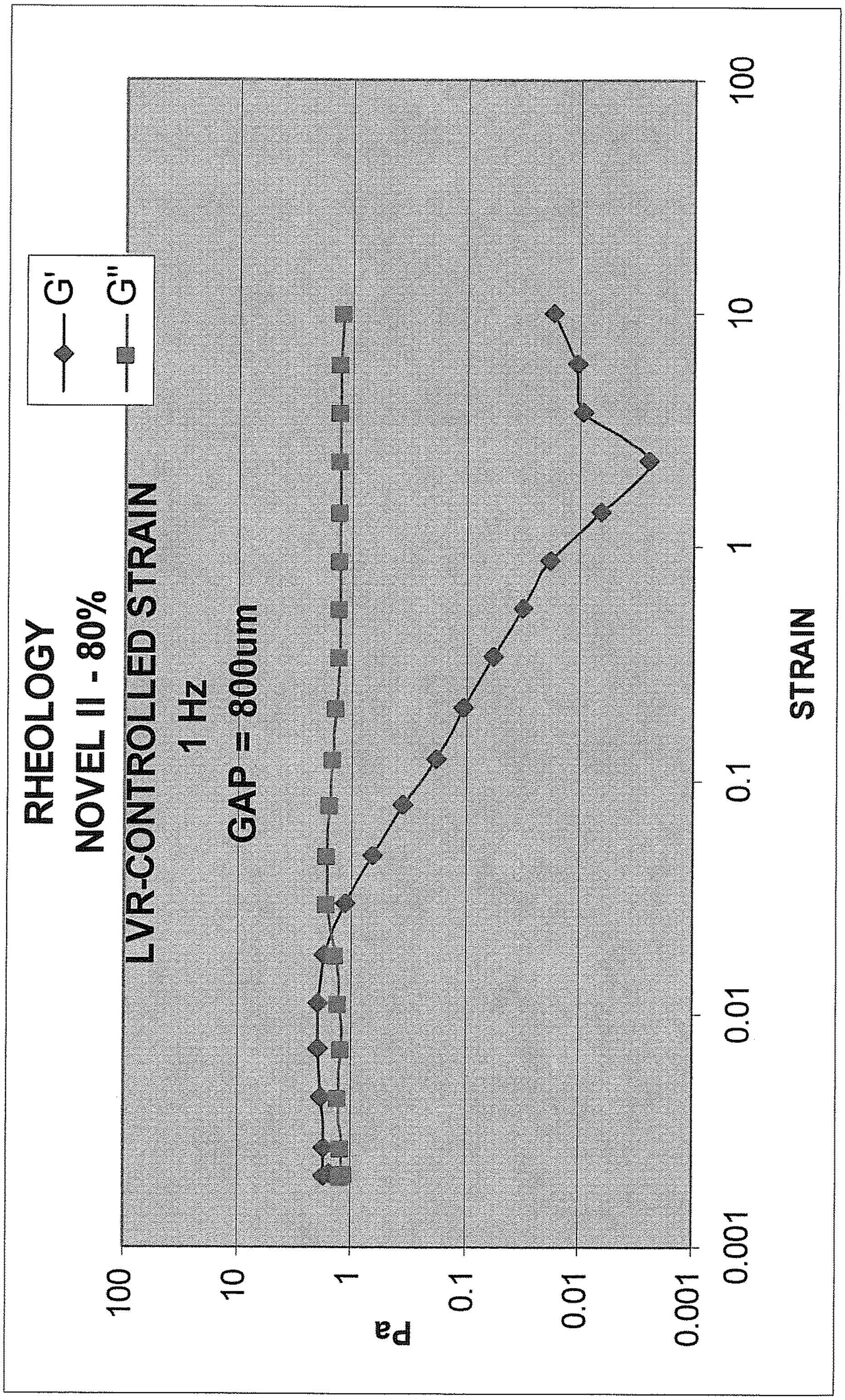
FIGS. 2A through 2F are graphical depictions of the G' and G" of exemplary sheeting agents, defoaming agents, and association disruption agents for use in the compositions of the present invention.
Figure 2B:
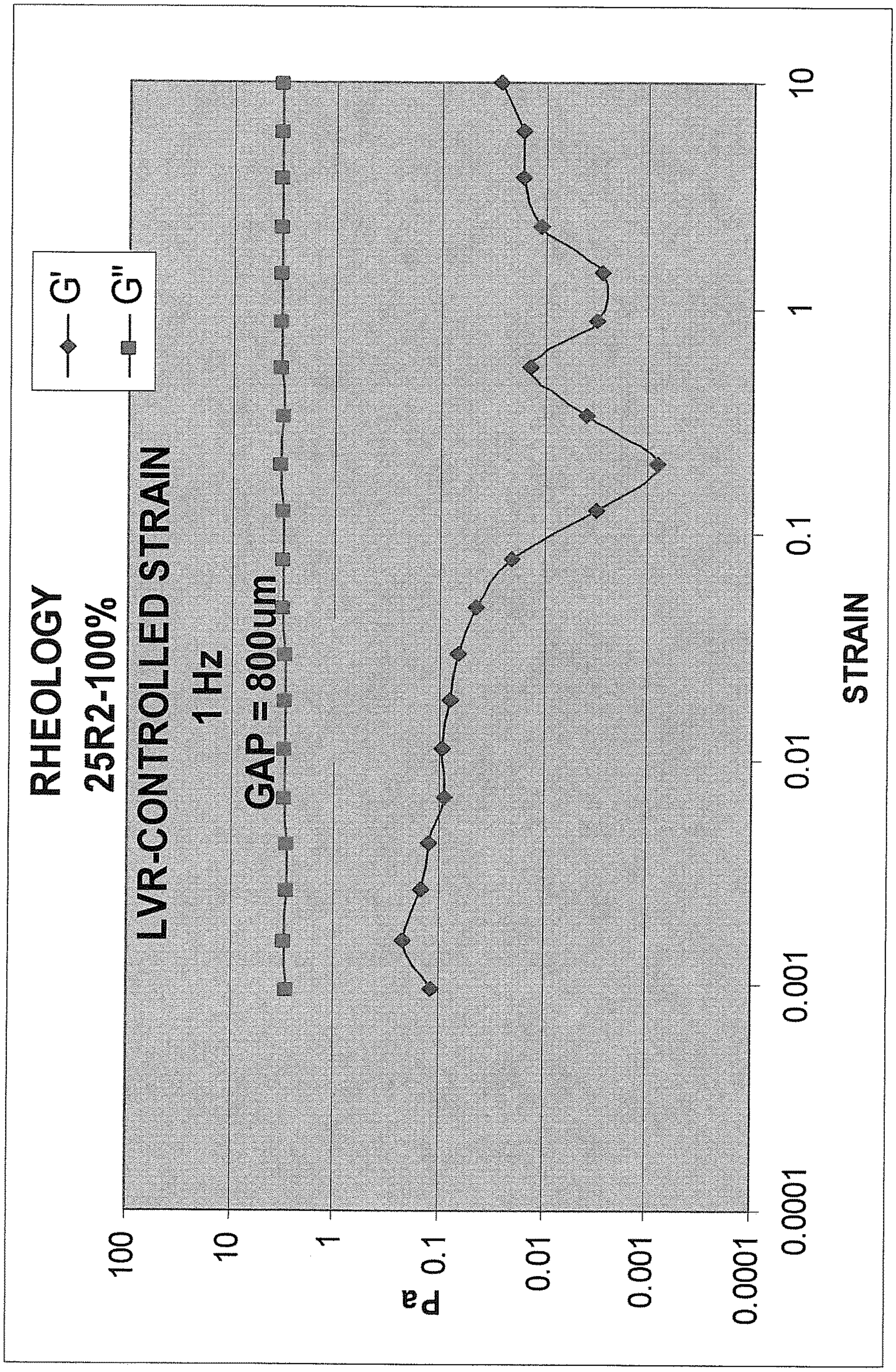
Figure 2C:
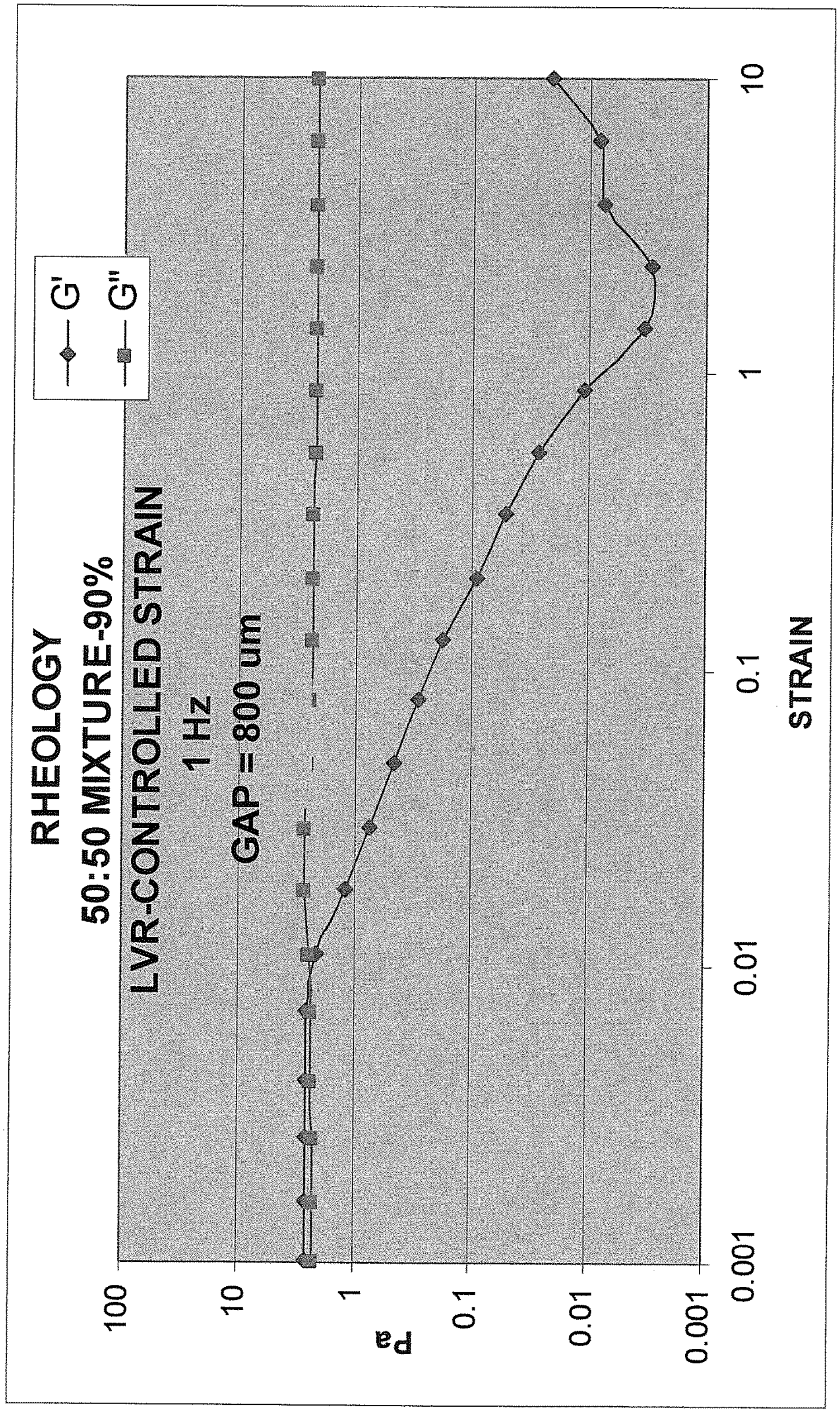
Figure 2D:
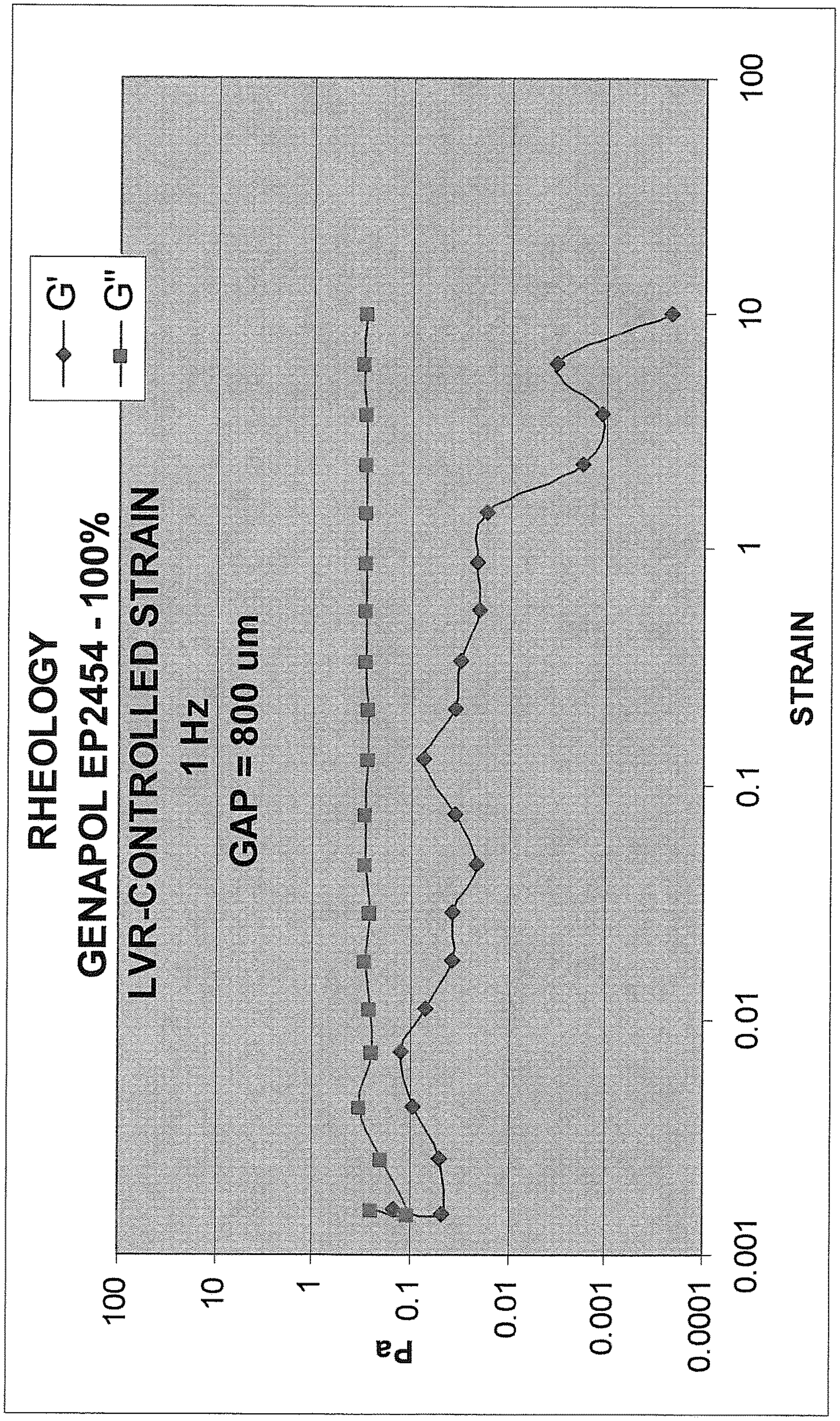
Figure 2E:
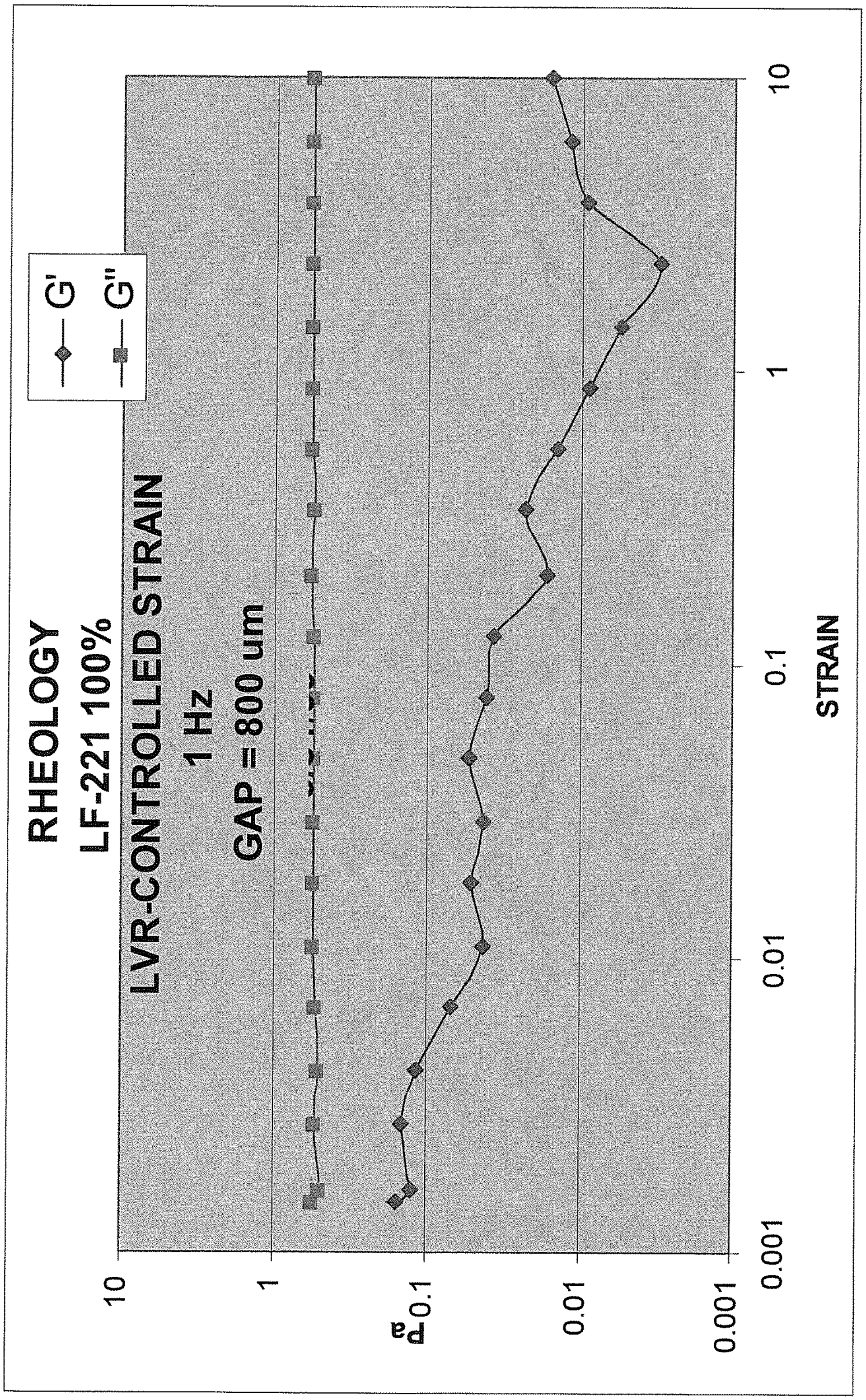
Figure 2F:
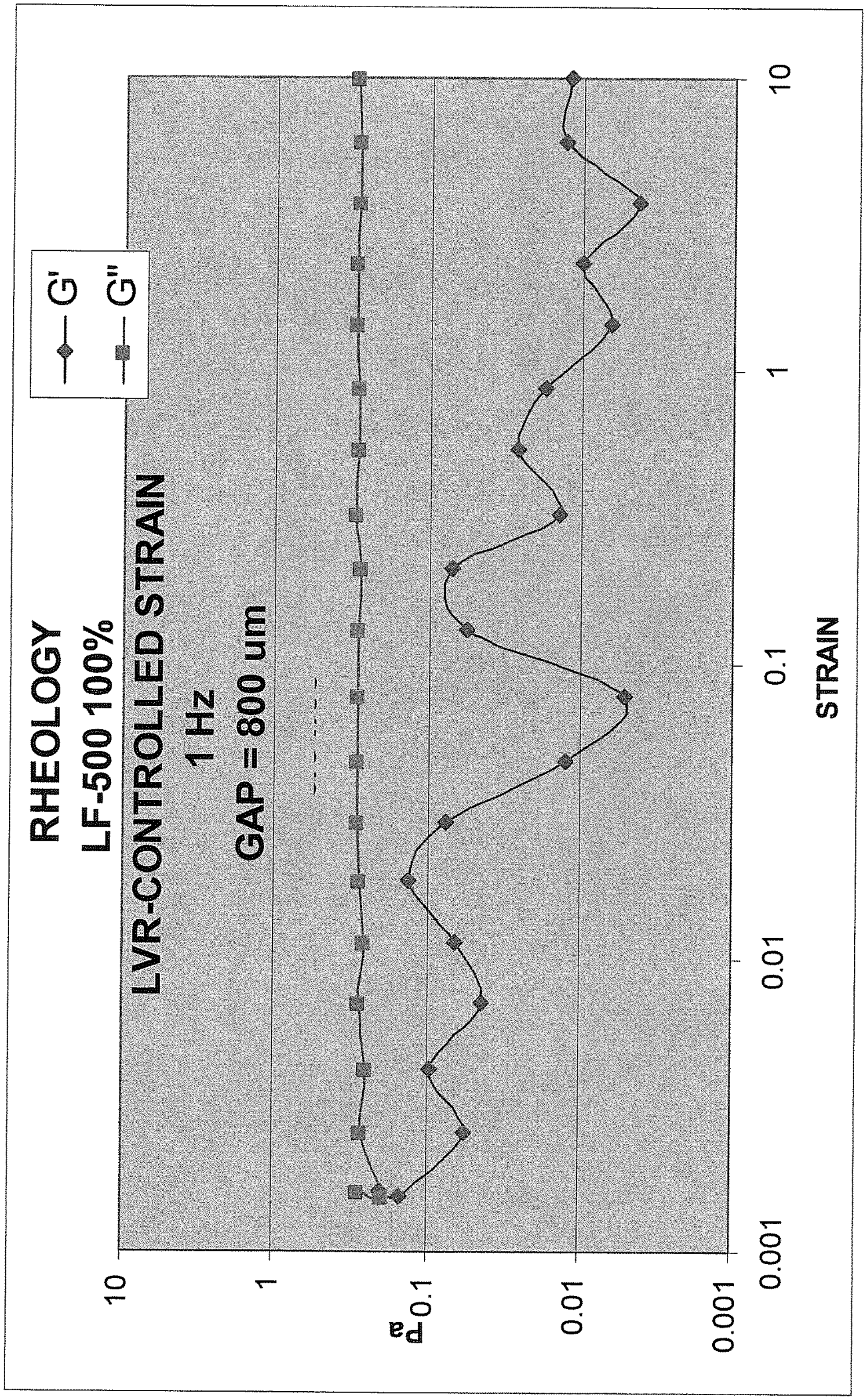
Figure 2G:
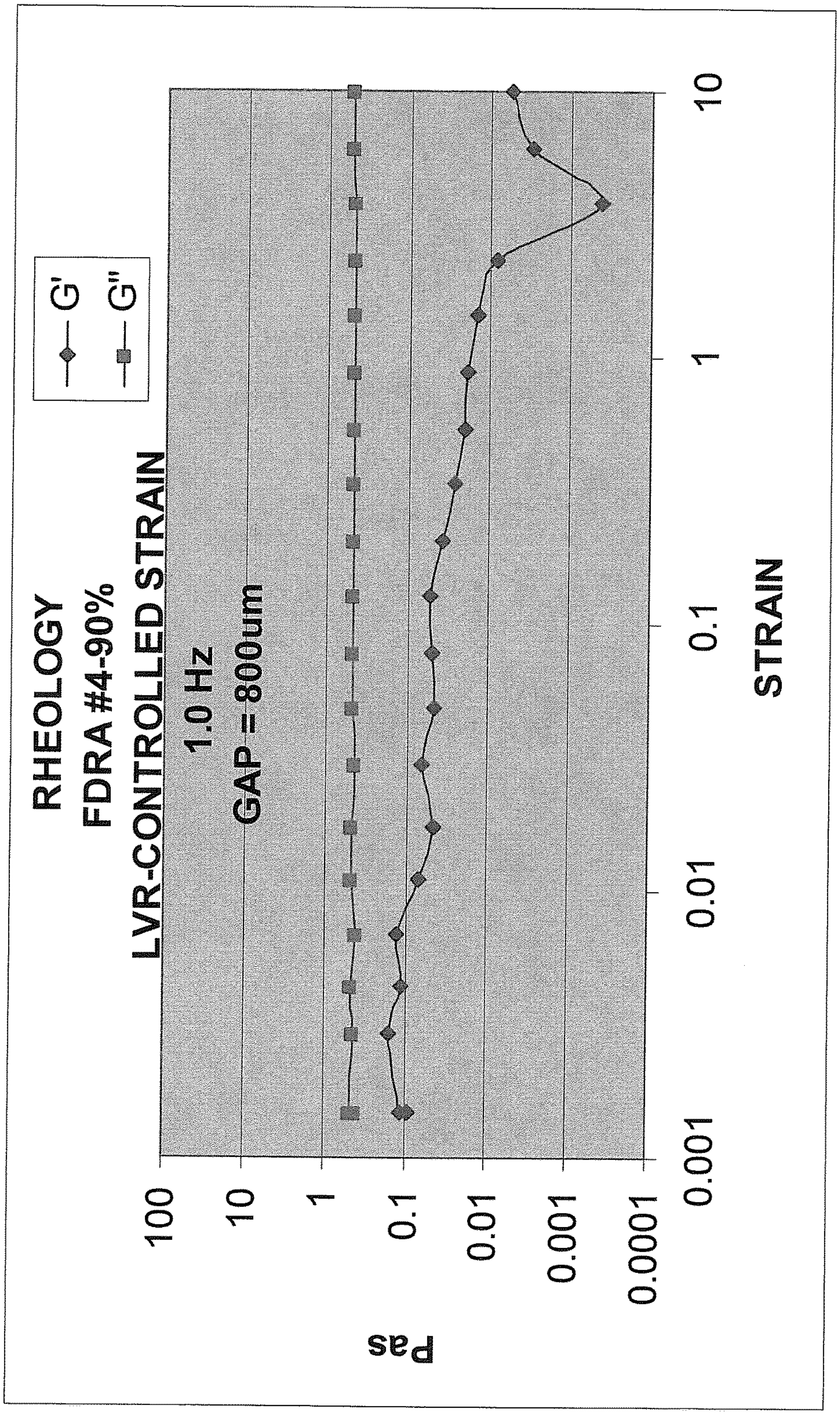
FIG. 2G is a graphical depiction of the G' and G" of an exemplary composition of the present invention.

Association disruption type surfactants, for example, Genapol EP-2454®, Plurafac LF-221®, and Plurafac LF-500®, all had relatively low G' and G" (FIGS. 2*d*, 2*e*, and 2*f*). This was expected due to their non-associative nature. However, a combination of all of the above types of surfactants, shown in FIG. 2G, had a very low G' and G" suggesting that the association disruption agent type surfactants disrupts the associations of the sheeting agent and defoaming agent type surfactants.

Other Embodiments

It is to be understood that while the invention has been described in conjunction with the detailed description thereof, the foregoing description is intended to illustrate, and not limit the scope of the invention, which is defined by the scope of the appended claims. Other aspects, advantages, and modifications are within the scope of the following claims.

In addition, the contents of all patent publications discussed supra are incorporated in their entirety by this reference.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The invention claimed is:

1. A rinse aid composition comprising:

(a) an alcohol ethoxylate according to the formula R—O—(CH2CH2O)n-H, wherein R is a C1-C12 alkyl group and n is an integer in the range of 1 to 100;

(b) a polyoxyethylene-polyoxypropylene block copolymer surfactant;

(c) an alcohol alkoxylate EO/PO surfactant and/or a C12-C14 fatty alcohol EO/PO surfactant; and (d) optionally, an acid source, an antimicrobial agent, and/or a chelant, wherein the ratio of the alcohol ethoxylate to polyoxyethylene-polyoxypropylene block copolymer is from about 1:1.5 to about 1:2.

2. The rinse aid composition of claim 1, wherein the composition is in aqueous form.

3. The rinse aid composition of claim 1 further comprising a polymeric polycarboxylate.

4. The rinse aid composition of claim 3 wherein said polymeric polycarboxylate is one or more of the following: a polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers.

5. The rinse aid composition of claim 4 wherein said polymeric polycarboxylate is a polyacrylic acid or polyacrylate.

6. The rinse aid composition of claim 1 further comprising a hydrotrope.

7. The rinse aid composition of claim 6 wherein the hydrotrope comprises an aromatic sulfonate.

8. The rinse aid of claim 7 wherein the aromatic sulfonate comprises xylene sulfonate, dialkyldiphenyl oxide sulfonate, or cumene sulfonate.

9. A rinse aid composition comprising:

(a) an alcohol ethoxylate according to the formula R—O—(CH2CH2O)n-H, wherein R is a C1-C12 alkyl group and n is an integer in the range of 1 to 100;

(b) a polyoxyethylene-polyoxypropylene block copolymer surfactant;

(c) an alcohol alkoxylate EO/PO surfactant and/or a C12-C14 fatty alcohol EO/PO surfactant;

(d) a polymeric polycarboxylate or alkali metal salt thereof; and (e) optionally an anti-microbial, wherein the ratio of the alcohol ethoxylate to polyoxyethylene-polyoxypropylene block copolymer is from about 1:1.5 to about 1:2.

10. The rinse aid of claim 9 further comprising an acid source.

11. A method for rinsing ware in a warewashing application comprising:

(a) providing a rinse aid composition according to claim 1;

(b) contacting the rinse aid composition with water to form a use solution; and (c) applying the use solution to the ware.

12. The method of claim 11, wherein the use solution comprises 2,000 ppm or less active materials.

13. The method of claim 11, wherein the rinse aid composition is in aqueous form.

14. The method of claim 13, wherein said contacting step comprises diluting the rinse aid composition with water to form a use solution.

15. The method of claim 11, wherein the ware comprises plasticware.

16. The method of claim 11, wherein the ware dries within about 30 to about 90 seconds after the use solution is applied to the ware.

* * * * *